United States Patent
Xian et al.

(10) Patent No.: US 11,756,154 B2
(45) Date of Patent: *Sep. 12, 2023

(54) APPARATUSES AND COMPUTER-IMPLEMENTED METHODS FOR MIDDLE FRAME IMAGE PROCESSING

(71) Applicant: Hand Held Products, Inc., Charlotte, NC (US)

(72) Inventors: Tao Xian, Mount Laurel, NJ (US); Chen Feng, Snohomish, WA (US); Gennady Germaine, Cherry Hill, NJ (US); Jeffrey Dean Harper, Charlotte, NC (US)

(73) Assignee: Hand Held Products, Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/457,842

(22) Filed: Dec. 6, 2021

(65) Prior Publication Data
US 2022/0092732 A1 Mar. 24, 2022

Related U.S. Application Data

(63) Continuation of application No. 16/684,121, filed on Nov. 14, 2019, now Pat. No. 11,222,401.

(51) Int. Cl.
*G06T 5/20* (2006.01)
*G06T 1/60* (2006.01)
*G06T 3/40* (2006.01)

(52) U.S. Cl.
CPC .............. *G06T 3/403* (2013.01); *G06T 1/60* (2013.01); *G06T 5/20* (2013.01)

(58) Field of Classification Search
CPC .. G06T 3/403; G06T 1/60; G06T 5/20; G06T 1/20; H04N 5/265; H04N 5/2258; H04N 23/45
See application file for complete search history.

(56) References Cited

U.S. PATENT DOCUMENTS 8,515,137 B2    8/2013  Richards et al.
8,754,941 B1 *  6/2014  Sarwari ............... H04N 5/2628
                                                         348/143

(Continued)

FOREIGN PATENT DOCUMENTS

EP    0910214 A1    4/1999
EP    1501300 B1    5/2011

OTHER PUBLICATIONS

Extended European Search Report issued in European Application No. 20206540.5 dated Apr. 1, 2021, 10 pages.

(Continued)

*Primary Examiner* — Siamak Harandi
(74) *Attorney, Agent, or Firm* — Alston & Bird LLP

(57) ABSTRACT

Embodiments described herein provide a middle frame image processing schema in a multi-sensor environment, for example improve image processing throughput and snappiness by processing middle frame image data objects of a middle frame image size that is shared amongst a plurality of image sensors. An example apparatus includes a plurality of image sensors, each configured to capture a full frame image data object and output a middle frame image data object. The apparatus further includes an image frame multiplexer communicable with each of the plurality of image sensors, and configured to receive a plurality of middle frame image data objects, and output a selected middle frame image data object from the plurality of middle frame image data objects. The apparatus further includes a processor communicable with the image frame multiplexer, and configured to receive the selected middle frame image data object, and process the selected middle frame image data object.

20 Claims, 10 Drawing Sheets

(56) References Cited

U.S. PATENT DOCUMENTS

| | | |
|---|---|---|
| 2004/0196378 A1 | 10/2004 | Kannermark et al. |
| 2006/0187338 A1 | 8/2006 | May et al. |
| 2006/0187388 A1 | 8/2006 | Ohyama et al. |
| 2008/0218612 A1 | 9/2008 | Border et al. |
| 2015/0055886 A1 | 2/2015 | Oh et al. |
| 2019/0068886 A1 | 2/2019 | Baek et al. |
| 2019/0274542 A1 | 9/2019 | Imamura et al. |

OTHER PUBLICATIONS

Communication about intention to grant a European patent dated Jul. 1, 2022 for EP Application No. 20206540.
Decision to grant a European patent dated Dec. 8, 2022 for EP Application No. 20206540.5.
European search opinion dated Apr. 1, 2021 for EP Application No. 20206540.
List of references cited by examiner Mailed on May 14, 2021 for U.S. Appl. No. 16/684,121.
Non-Final Rejection dated May 14, 2021 for U.S. Appl. No. 16/684,121.
Notice of Allowance and Fees Due (PTOL-85) dated Sep. 24, 2021 for U.S. Appl. No. 16/684,121.
European search report dated Mar. 16, 2023 for EP Application No. 22214098.

\* cited by examiner

APPARATUSES AND COMPUTER-IMPLEMENTED METHODS FOR MIDDLE FRAME IMAGE PROCESSING

CROSS-REFERENCE TO RELATED APPLICATIONS

This application claims priority to U.S. Non-Provisional application Ser. No. 16/684,121, filed Nov. 14, 2019, titled "APPARATUSES AND COMPUTER-IMPLEMENTED METHODS FOR MIDDLE FRAME IMAGE PROCESSING," the contents of which are incorporated by reference herein in their entirety.

TECHNOLOGICAL FIELD

Embodiments of the present disclosure generally relate to image processing and specifically, to apparatuses and computer-implemented methods for image processing in a multi-sensor environment utilizing a common image data format (e.g., a middle frame image size) among all image sensors.

BACKGROUND

In conventional imaging apparatuses that include two or more image sensors, the images outputted by the image sensors need to be combined into one output for processing. Similarly, the signal needs to be synchronized between the two or more sensors to maintain system efficiency and efficacy. To perform such operations, conventional imaging apparatuses traditionally utilize a programmable logic devices, such as a complex programmable logic device ("CPLD") or field programmable gate array ("FPGA"). Such computing devices add system delay to the one or more frames, and add to the complexity, cost, and size of the apparatuses. Further, conventional imaging apparatuses traditionally utilize dynamic switching of image sensors. Conventional dynamic switching between the two or more sensors traditionally requires operating system and/or driver support, and traditionally requires each image sensor to be re-initialized when switching between the two or more sensors, further reducing system snappiness. Applicant has discovered problems with current implementations for conventional image processing in multi-sensor environments having two or more image sensors. Through applied effort, ingenuity, and innovation, Applicant has solved many of these identified problems by developing solutions embodied in the present disclosure, which are described in detail below.

BRIEF SUMMARY

In general, embodiments of the present disclosure provided herein include systems, methods, apparatuses and computer program products for middle frame image processing. Other systems, apparatuses, methods, computer readable media, and features will be, or will become, apparent to one with skill in the art upon examination of the following figures and detailed description. It is intended that all such additional systems, apparatuses, methods, computer readable media, and features be included within this description be within the scope of the disclosure, and be protected by the following claims.

In accordance with one aspect of the present disclosure, a middle frame image processing apparatus includes a first image sensor configured to output a first middle frame image data object based on a first full frame image size and a middle frame image size. The example middle frame image processing apparatus further includes a second image sensor configured to output a second middle frame image data object based on a second full frame image size and the middle frame image size. The example middle frame image processing apparatus further includes an image frame multiplexer that is in data communication with the first image sensor and the second image sensor, and is configured to receive the first middle frame image data object from the first image sensor and receive the second middle frame image data object from the second image sensor. The image frame multiplexer is further configured to output a selected middle frame image data object of the first middle frame image data object or the second middle frame image data object. The example middle frame image processing apparatus further includes a processor communicable with the image frame multiplexer, the processor configured to receive the selected middle frame image data object from the image frame multiplexer and process the selected middle frame image data object.

Additionally or alternatively, in at least some example embodiments of the apparatus, at least the first image sensor is configured based on the middle frame image size, and, to output the middle frame image data object, the first image sensor is configured to generate the first middle frame image data object from a first full frame image data object by performing one or more of (1) cropping the first full frame image data object to include, in the first middle frame image data object, a cropped image data portion of the first full frame image data object, the cropped image data portion identified based on the first full frame image size and the middle frame image size, and (2) padding the first middle frame image data object based on an image data padding, the image data padding identified based on the first full frame image size and the middle frame image size, and transmit the first middle frame image data object to the image frame multiplexer.

Additionally or alternatively, in at least some example embodiments of the apparatus, the first full frame image size differs from the second full frame image size by at least one or more data rows and/or one or more data columns.

Additionally or alternatively, in at least some example embodiments of the apparatus, the first full frame image size is equivalent to the second full frame image size by having a shared number of data rows and a shared number of data columns.

Additionally or alternatively, in at least some example embodiments of the apparatus, the processor is configured to process the selected middle frame image data object to determine useful data is missing from the selected middle frame image data object. Additionally or alternatively, in some example embodiments of the apparatus, the processor is further configured to identify, based on the selected middle frame image data object, a selected image sensor of the first image sensor or the second image sensor. Additionally or alternatively, in some embodiments of the apparatus, the processor is further configured to transmit a full frame request signal to the selected image sensor. Additionally or alternatively, in some embodiments of the apparatus, the processor is further configured to receive a selected full frame data object from the selected image sensor, the full frame image data object including more data than the selected middle frame image data. Additionally or alternatively, in some embodiments of the apparatus, the processor is further configured to process the selected full frame image data object.

Additionally or alternatively, in at least some example embodiments of the apparatus, the processor is further configured to configure at least one of the first image sensor to output the first middle frame image data object based on the middle frame image size, and the second image sensor to output the second middle frame image data object based on the middle frame image size. Additionally or alternatively, in at least some example embodiments of the apparatus, to configure at least one of the first image sensor and the second image sensor, the apparatus is configured to identify the first full frame image size associated with the first image sensor and the second full frame image size associated with the second image sensor; determine a largest image size based on the first full frame image size and the second full frame image size; determine a smallest image size based on the first full frame image size and the second full frame image size; generate the middle frame image size based on the largest image size and the smallest image size; and configure at least one of the first image sensor and the second image sensor based on the middle frame image size.

Additionally or alternatively, in at least some example embodiments of the apparatus, the image frame multiplexer is configured to receive a frame selection signal from the processor, the frame selection signal indicating which of the first middle frame image data object or the second middle frame image data object is to be selected. Additionally or alternatively, in at least some such example embodiments of the apparatus, the processor is further configured to generate the frame selection signal using a randomized frame selection algorithm or a sequential frame selection algorithm; and transmit the frame selection signal to the image frame multiplexer. Additionally or alternatively, in at least some example embodiments of the apparatus, the processor is further configured to generate the frame selection signal by processing the received selected middle frame image data object; and transmit the frame selection signal to the image frame multiplexer.

In accordance with yet another aspect of the disclosure, a computer-implemented method for middle frame image processing is provided. The computer-implemented method is, in one or more embodiments, implemented via computing hardware, circuitry, and/or the like as described herein. In at least one example embodiment of the computer-implemented method, the example computer-implemented method includes outputting, to an image frame multiplexer, a first middle frame image data object from a first image sensor and a second middle frame image data object from a second image sensor, the first middle frame image data object and the second middle frame image data object associated with a middle frame image size. The computer-implemented method further includes selecting, by the image frame multiplexer, a selected middle frame image data object comprising the first middle frame image data object or the second middle frame image data object. The computer-implemented method further includes receiving, by a processor, the selected middle frame image data object from the image frame multiplexer. The computer-implemented method further includes processing, by the processor, the selected middle frame image data object.

Additionally or alternatively, in at least some example embodiments of the computer-implemented method, outputting, to the image frame multiplexer, a first middle frame image data object form a first image sensor includes capturing, by the first image sensor, a first full frame image data object associated with a first full frame image size; identifying, by the first image sensor, the middle frame image size; identifying, by the first image sensor, a cropped image data portion of the first full frame image data object based on the first full frame image size and the middle frame image size; identifying, by the first image sensor, a first image data padding based on the first full frame image size and the middle frame image size; generating, by the first image sensor, the first middle frame image data object based on the cropped image data portion of the first full frame image data object and the first image data padding; and transmitting, by the first image sensor, the first middle frame image data object to the image frame multiplexer.

Additionally or alternatively, in at least some example embodiments of the computer-implemented method, Additionally or alternatively, in at least some example embodiments of the computer-implemented method, the first image sensor is associated with a first full frame image size and the second image sensor is associated with a second full frame image size, where the first full frame image size differs from the second full frame image size by at least one or more data rows and/or one or more data columns.

Additionally or alternatively, in at least some example embodiments of the computer-implemented method, the first image sensor is associated with a first full frame image size and the second image sensor is associated with a second full frame image size, where the first full frame image size is equivalent to the second full frame image size by having a shared number of data rows and a shared number of data columns.

Additionally or alternatively, in at least some example embodiments of the computer-implemented method, processing, by the processor, the selected middle frame image data object includes processing, by the processor, the selected middle frame image data object to determine useful data is missing from the selected middle frame image data object, and the computer-implemented method further includes identifying, by the processor, a selected image sensor from the first image sensor or the second image sensor based on the selected middle frame image data object; transmitting, by the processor, a full frame request signal to the selected image sensor; receiving, by the processor, a selected full frame data object from the selected image sensor, the full frame image data object including more data than the selected middle frame image data object; and processing, by the processor, the selected full frame image data object.

Additionally or alternatively, in at least some example embodiments of the computer-implemented method, the computer-implemented method further includes configuring, by the processor, the first image sensor to output the first middle frame image data object based on the middle frame image size. Additionally or alternatively, in at least some such example embodiments of the computer-implemented method configuring the first image sensor to output the first middle frame image data object based on the middle frame image size includes identifying, by the processor, at least a first full frame image size associated with the first image sensor and a second full frame image size associated with the second image sensor; determining, by the processor, a largest image size based on the first full frame size and the second full frame image size; determining, by the processor, a smallest image size based on the first full frame image size and the second full frame image size; generating, by the processor, the middle frame image size based on the largest image size and the smallest image size; and configuring, by the processor, the first image sensor to output the first middle frame image data object based on the middle frame image size.

Additionally or alternatively, in at least some example embodiments of the computer-implemented method, selecting, by the image frame multiplexer, the selected middle frame image data object includes receiving, by the image frame multiplexer, a frame selection signal from the processor, the frame selection signal indicating which of the plurality of middle frame image data objects is to be selected; and selecting, by the image frame multiplexer, the selected middle frame image data object, from the first middle frame image data object and the second middle frame image data object, based on the frame selection signal. Additionally or alternatively, in at least some such example embodiments of the computer-implemented method, the computer-implemented method further includes generating, by the processor, the frame selection signal using a randomized frame selection algorithm or a sequential frame selection algorithm; and transmitting, by the processor, the frame selection signal to the image frame multiplexer. Additionally or alternatively, in at least some example embodiments of the computer-implemented method, the computer-implemented method further includes generating, by the processor, the frame selection signal by processing the received selected middle frame image data object; and transmitting, by the processor, the frame selection signal to the image frame multiplexer.

In accordance with yet another aspect of the disclosure, a computer program product for middle frame image processing is provided. At least one example computer program product includes a non-transitory computer-readable storage medium having computer program instructions stored thereon. The computer program instructions, in execution with at least one processor, are configured for performing one or more of the identified computer-implemented methods.

BRIEF DESCRIPTION OF THE DRAWINGS

Figure 1:
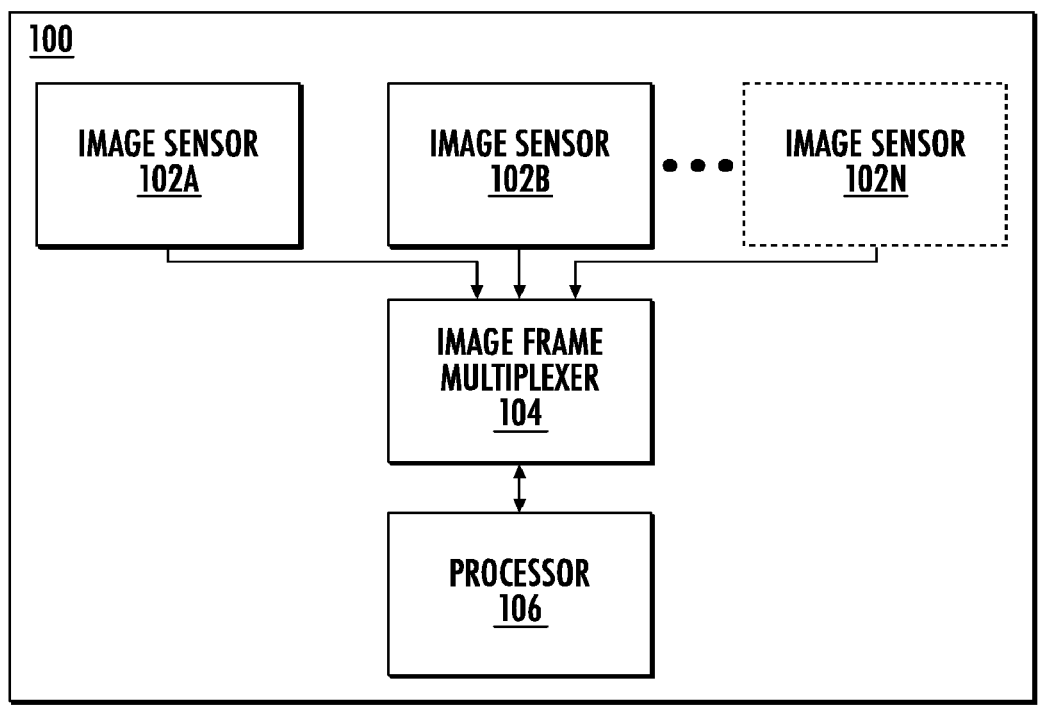
Figure 2:
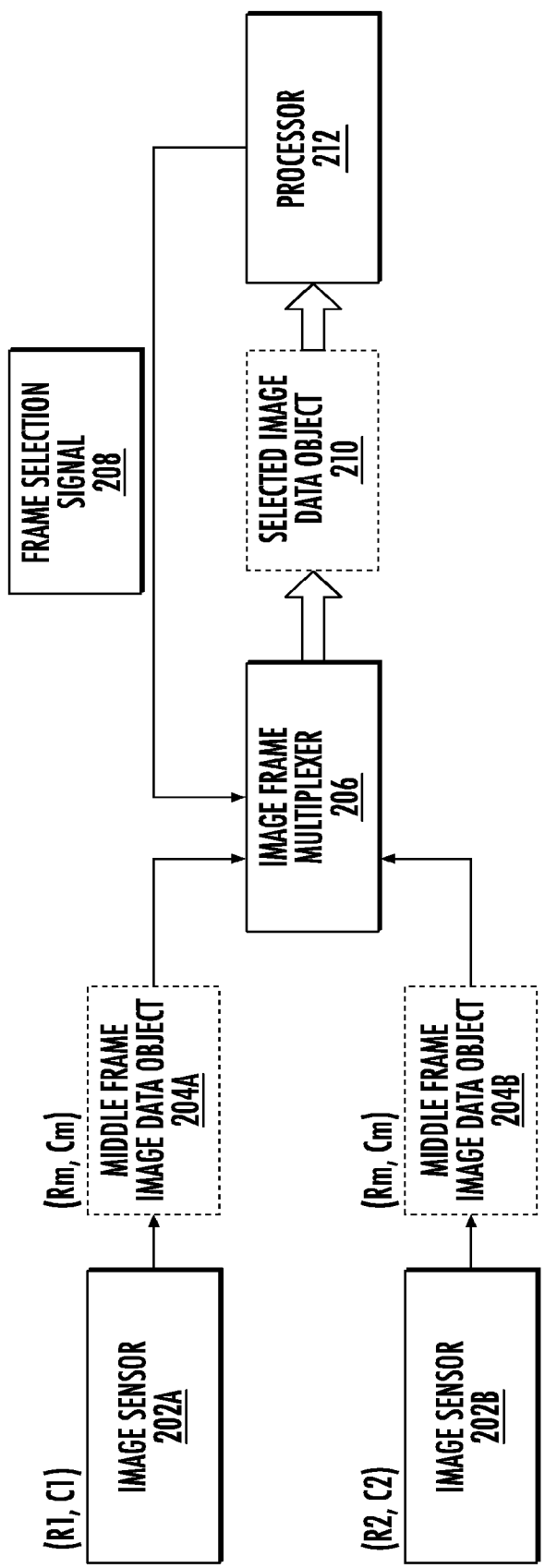
Figure 3:
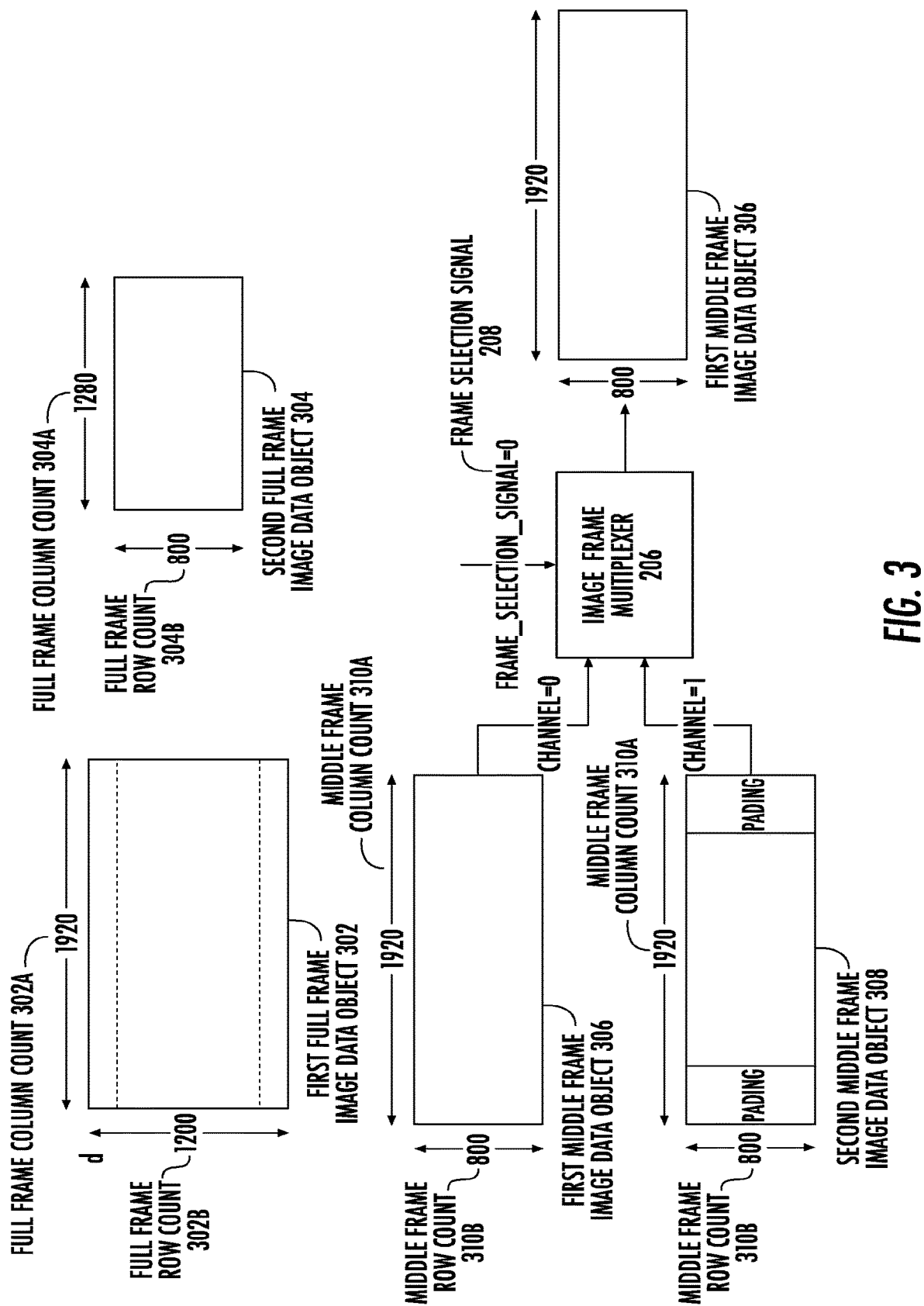
Figure 4:
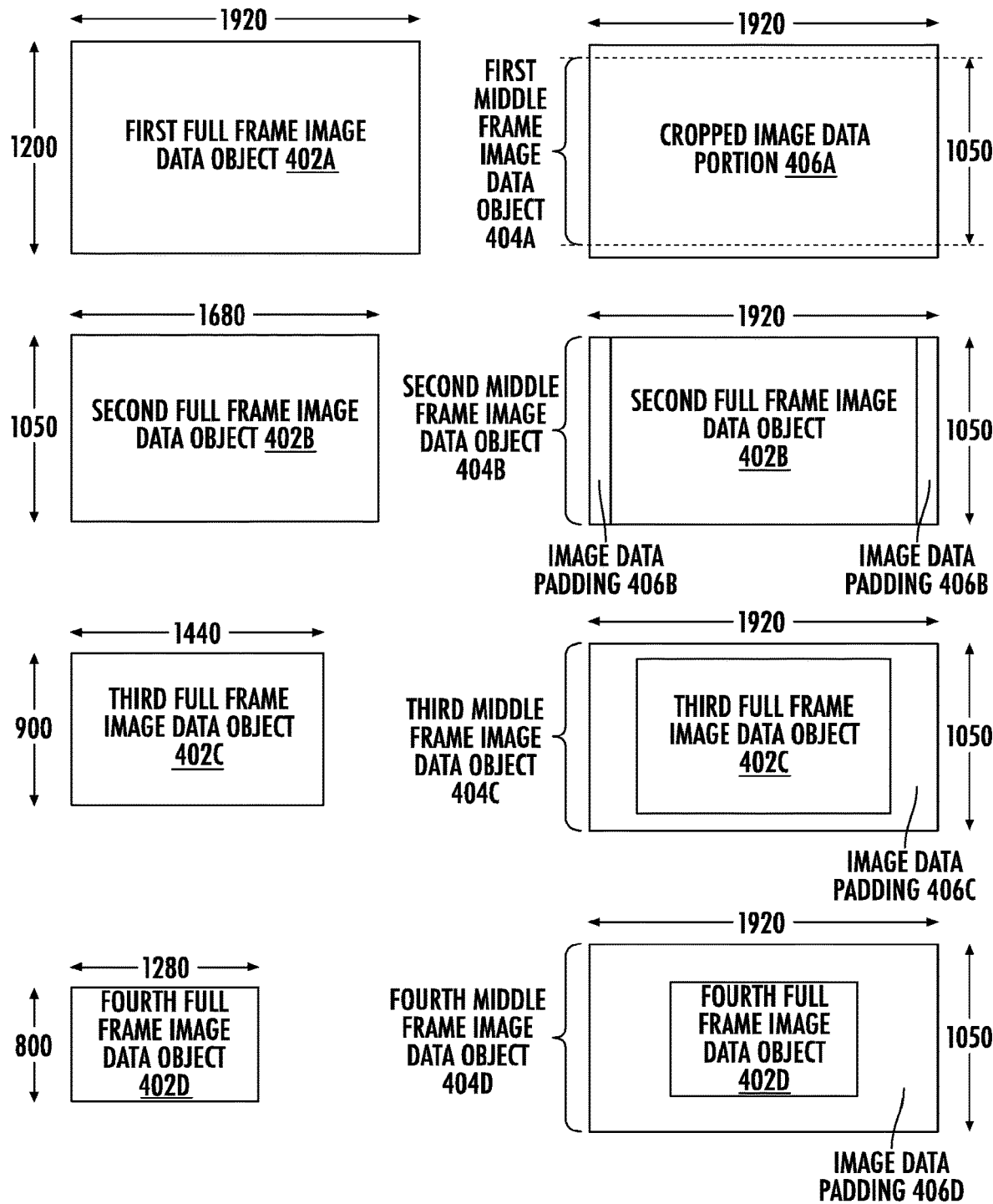
Figure 5:
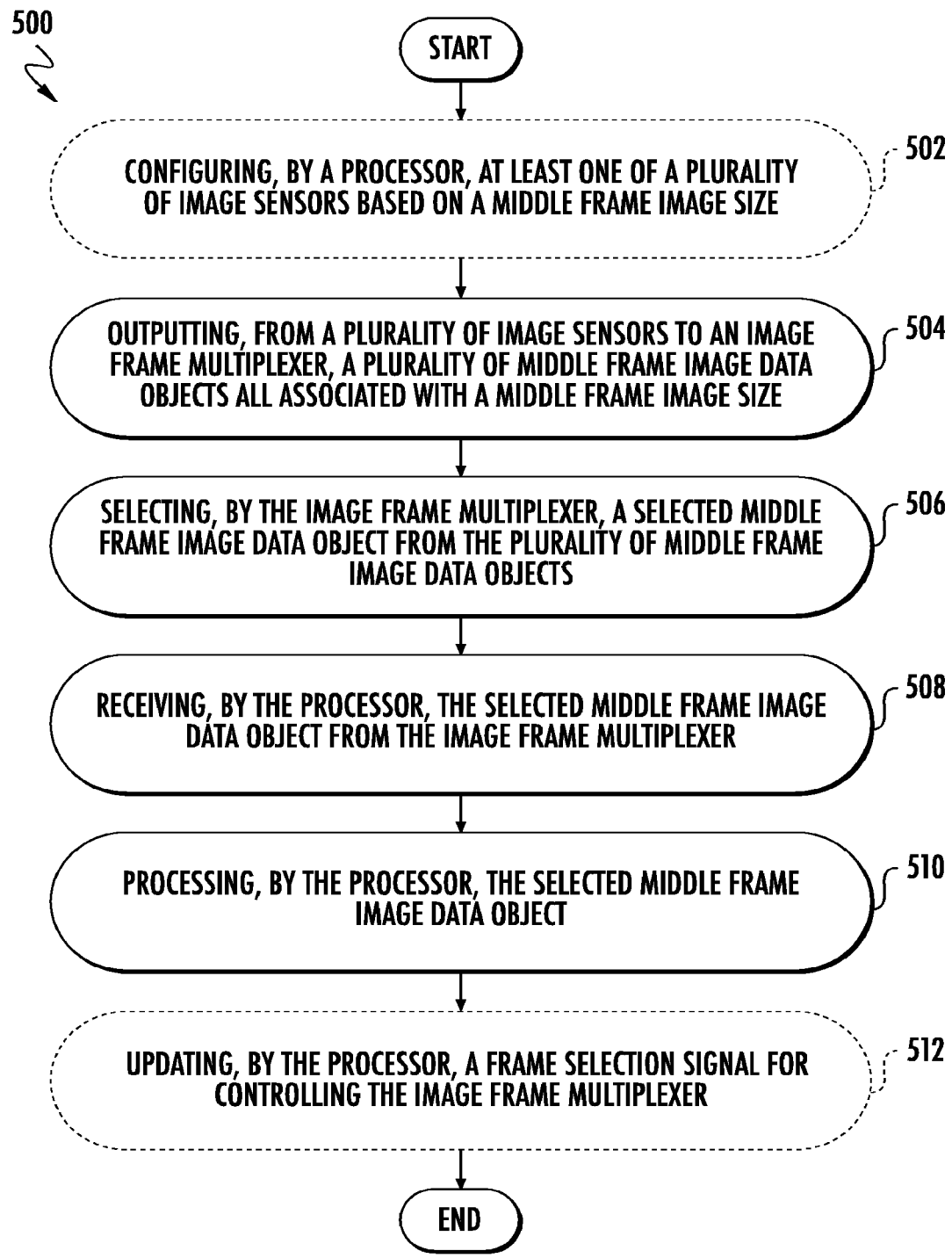
Figure 6:
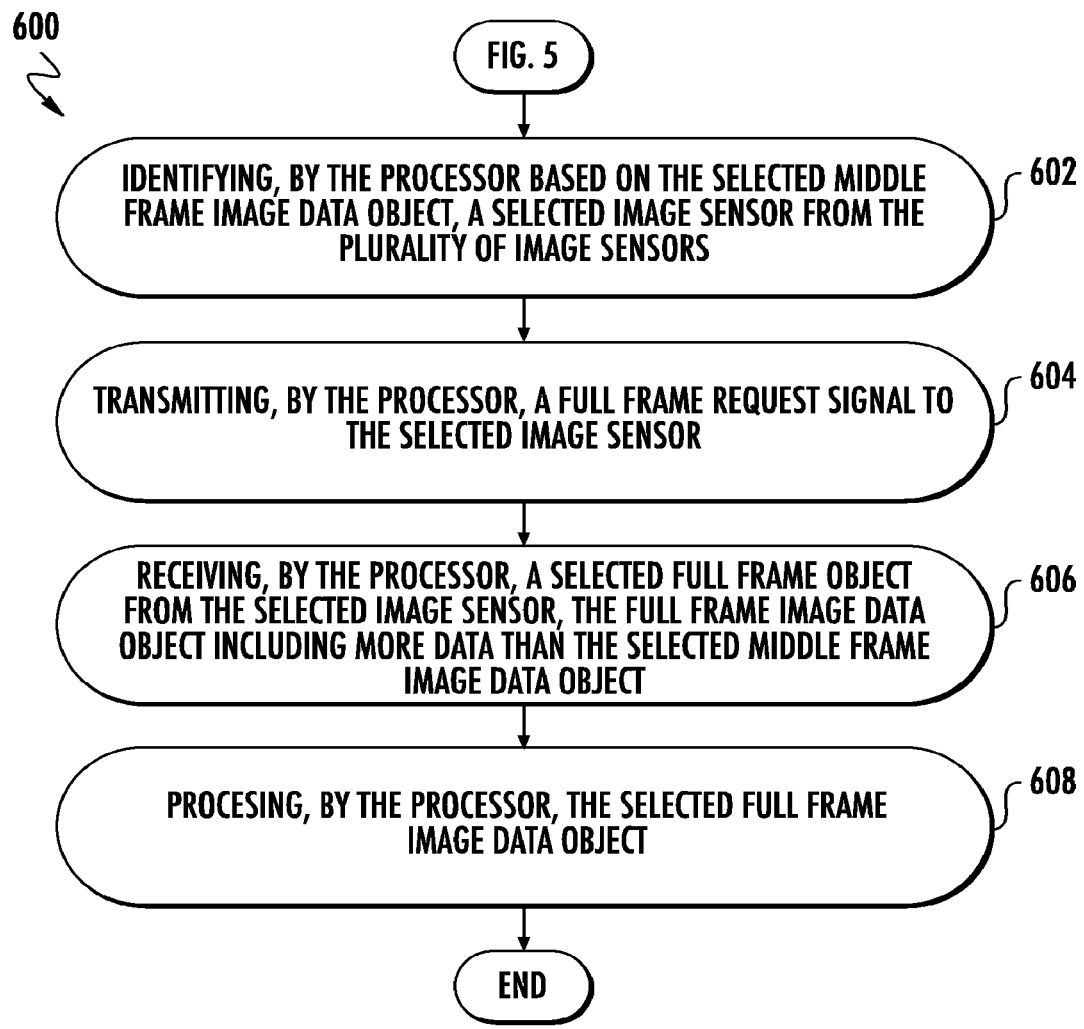
Figure 7:
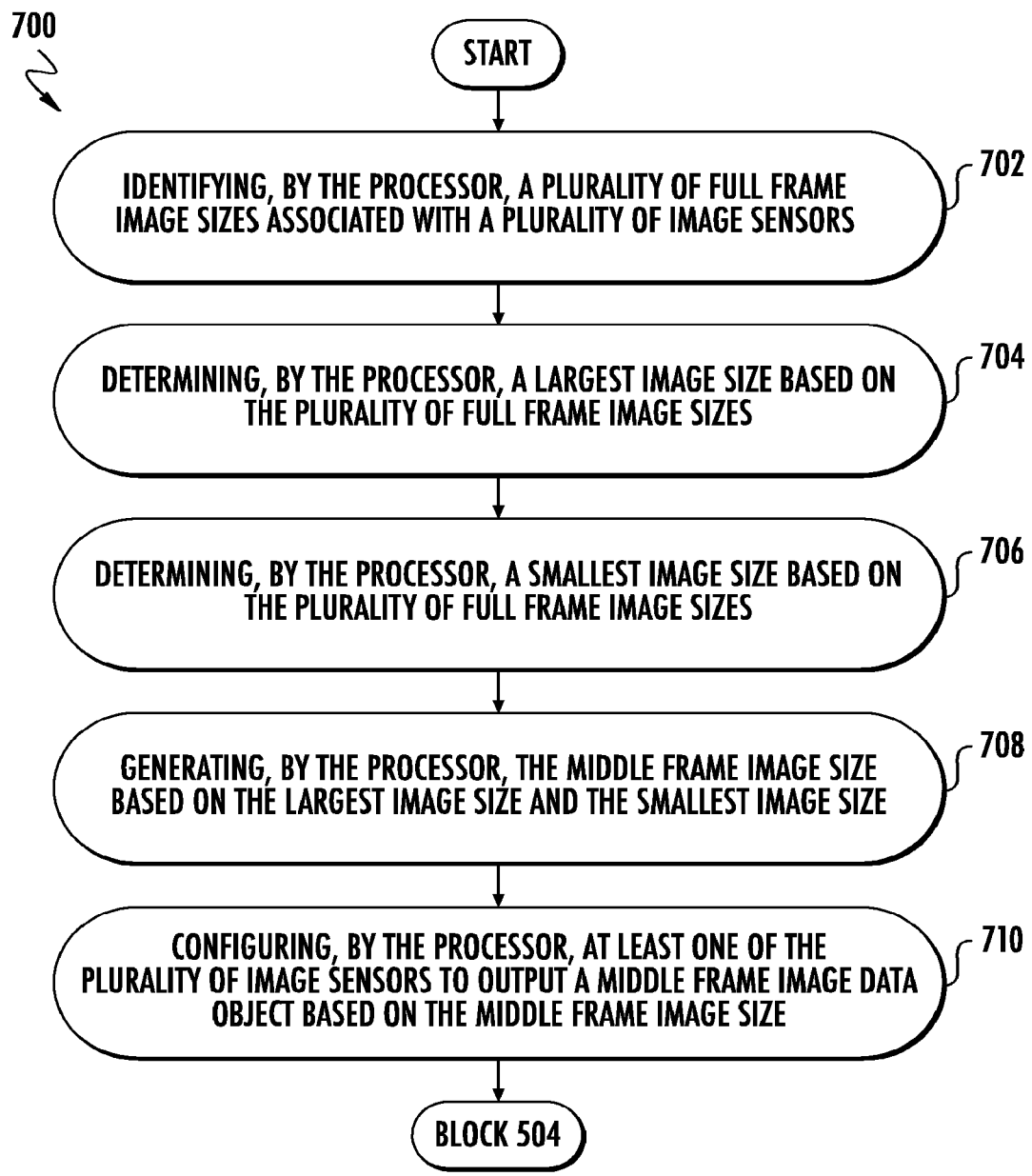
Figure 8:
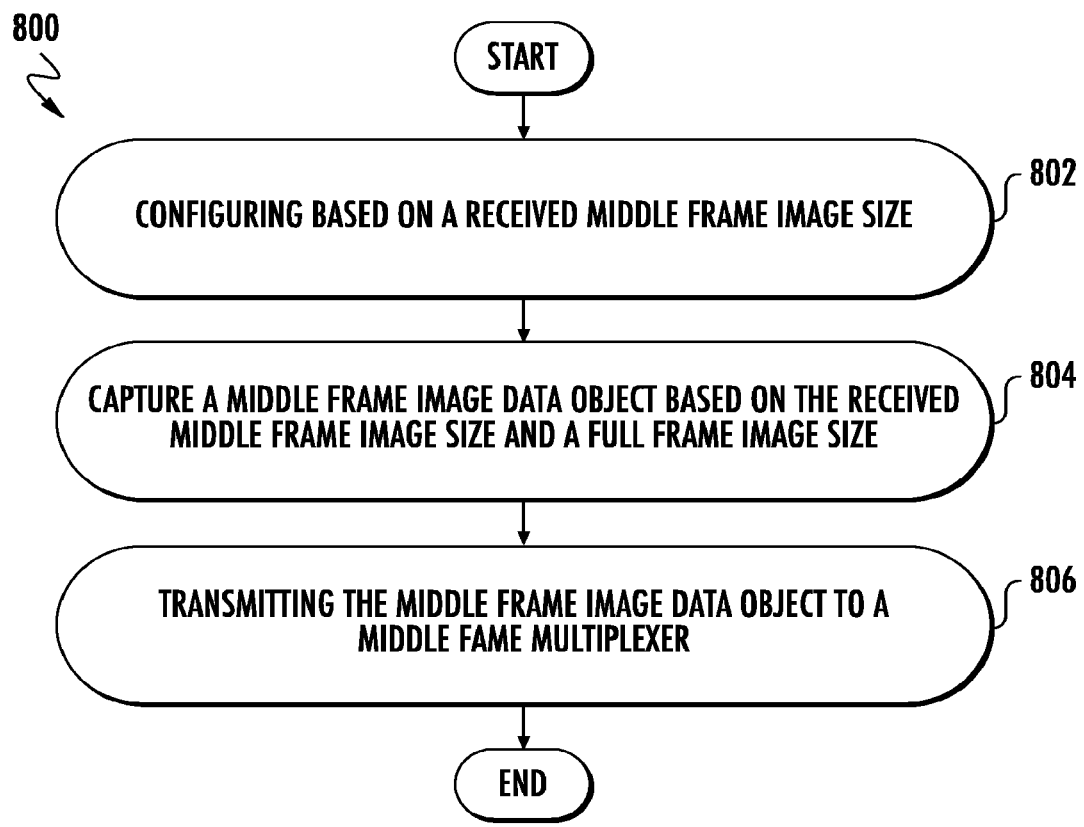
Figure 9:
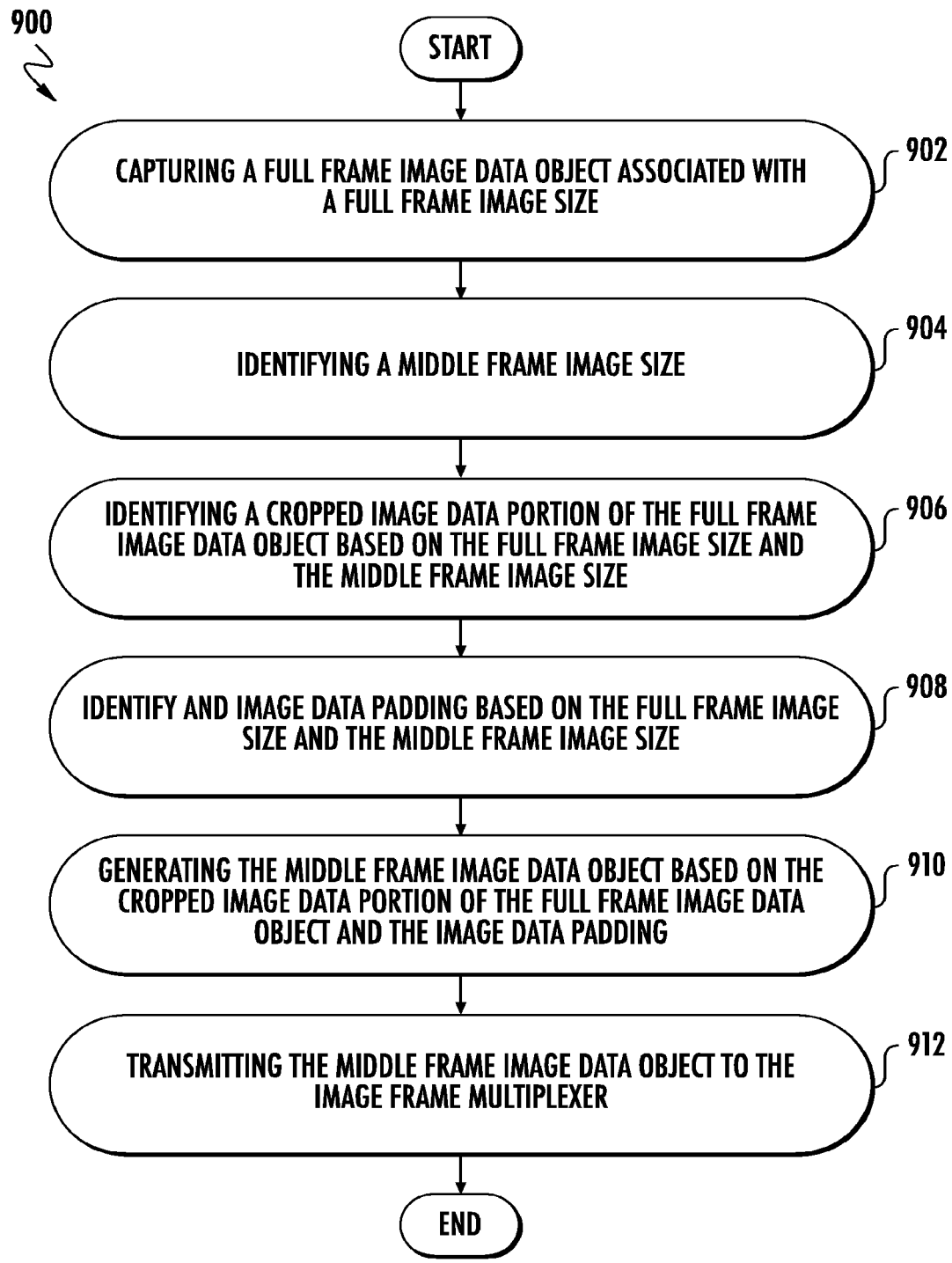
Figure 10:
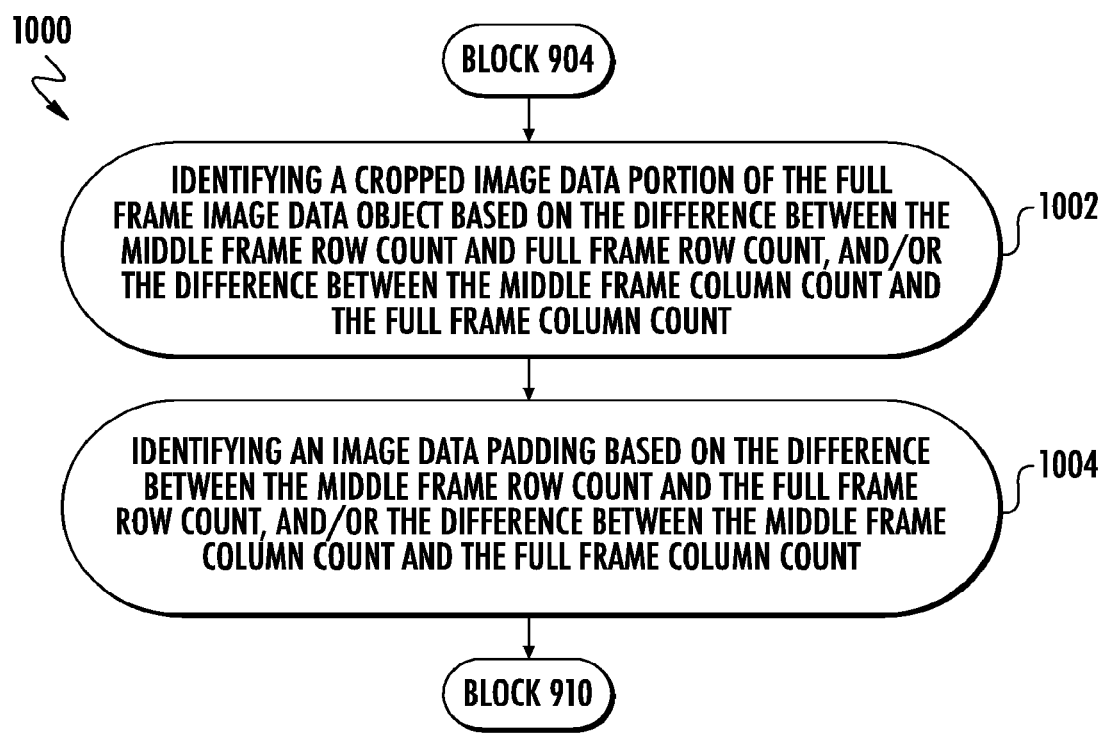

Having thus described the embodiments of the disclosure in general terms, reference now will be made to the accompanying drawings, which are not necessarily drawn to scale, and wherein:

FIG. 1 illustrates a middle frame image processing apparatus, in accordance with at least some example embodiments of the present disclosure;

FIG. 2 illustrates components of an example middle frame image processing apparatus and a corresponding data flow, in accordance with at least some example embodiments of the present disclosure;

FIG. 3 illustrates an example visualization of the functionality of an image frame multiplexer for selecting a middle image data object in a dual-sensor environment, in accordance with at least some example embodiments of the present disclosure;

FIG. 4 illustrates example middle frame image data objects in a multi-sensor environment, in accordance with at least some example embodiments of the present disclosure;

FIG. 5 illustrates an example flowchart including example operations for middle frame image processing, in accordance with at least some example embodiments of the present disclosure;

FIG. 6 illustrates an example flowchart including additional operations for middle frame image processing, specifically for corresponding full frame image data object processing, in accordance with at least some example embodiments of the present disclosure;

FIG. 7 illustrates an example flowchart including additional operations for middle frame image processing, specifically for configuring one or more image sensors for outputting middle frame image data objects, in accordance with at least some example embodiments of the present disclosure;

FIG. 8 illustrates an example flowchart including operations for middle frame image data object generating, for example to be performed by an image sensor, in accordance with at least some example embodiments of the present disclosure;

FIG. 9 illustrates an example flowchart including operations for an example implementation for middle frame image data object generating, for example to be performed by an image sensor, in accordance with at least some example embodiments of the present disclosure; and FIG. 10 illustrates an example flowchart including additional operations for middle frame image data object generating, for example to be performed by an image sensor, specifically for padding and/or cropping a full frame image data object to generate a corresponding middle frame image data object, in accordance with at least some example embodiments of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview

Embodiments of the present disclosure address the various computing and cost inefficiencies of conventional imaging apparatuses. Particularly, embodiments of the present disclosure utilize an example middle frame scheme to provide various advantages over conventional imaging apparatuses and corresponding conventional schemes. In this regard, embodiments of the present disclosure improve, in some examples, overall image processing throughput (e.g., framerate for processing captured data) and snappiness (e.g., a time between triggering capture and an indication of successfully capturing and processing a captured image, such as between triggering capture and receiving an indication of a successful barcode decoding). To improve the snappiness of the apparatus, the time delay for switching between different image sensors is reduced in at least some of the embodiments described herein. In this regard, some embodiments of the present disclosure enable seamless switching between different image sensor channels. Additionally, some embodiments of the present disclosure do not utilize a programmable logic device and, such example embodiments enable smaller form factors that may be included in smaller size apparatuses. Similarly, in this regard, some such example embodiments include components that are less costly than the programmable logic device modules, thus enabling manufacturing of such embodiments at improved cost efficiency in comparison to conventional apparatuses.

In some examples, the middle frame scheme utilizes a particular middle frame image format across all image sensors of a particular apparatus. In this regard, the middle frame image format embodies a middle frame image size, which defines a particular number of rows and columns within a middle frame image data object (e.g., a "middle frame row count" and a "middle frame column count"). The middle frame size may be determined based on the associated plurality of image sensors. Each of the plurality of image sensors may be associated with any resolution, pixel architecture, and data rate. In this regard, each image sensor may be configured to capture a full frame image data object having a particular image size (e.g., a full frame image size), and subsequently generate the middle frame image data object from the full frame image data object for outputting. As such, the middle frame size represents a shared image size for image data objects outputted by each of the plurality of image sensors. In some embodiments, the image sensors are specially configured based on a middle frame image size that leverage the resolution and bandwidth associated with the plurality of image sensors to maximize the advantages herein.

In this regard, example embodiments disclosed herein include a plurality of image sensors that each generate middle frame image data objects, each of a shared size. The middle frame image data objects are each associated with the same middle frame image size, irrespective of the resolution, pixel architecture, and/or data rate for each image sensor. In so doing, the middle frame scheme enables seamless switching between the plurality of image sensors using smaller and more cost effective components. Additionally, the middle frame scheme advantageously, in some examples, improves apparatus throughput and snappiness.

Definitions

In some embodiments, some of the operations herein may be modified or further amplified. Furthermore, in some embodiments, additional optional operations may be included. Modifications, amplifications, or additions to the operations herein may be performed in any order and in any combination.

Many modifications and other embodiments of the disclosure set forth herein will come to mind to one skilled in the art to which these inventions pertain having the benefit of the teachings presented in the foregoing description and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described herein are also contemplated as may be set forth in some of the appended claims. Although specific terms are employed herein, they are used in a generic and descriptive sense only and not for purposes of limitation.

As used herein, the terms "data object," "data," "content" "information," and similar terms may be used interchangeably to refer to data capable of being transmitted, received, and/or stored in accordance with embodiments of the present disclosure. Additionally, data objects may refer to values captured, generated, or derived by embodiments described herein. Thus, use of any such terms should not be taken to limit the spirit and scope of embodiments of the present disclosure.

The term "processor" refers to computing hardware, firmware, and/or software for performing one or more instructions representing computer-implemented actions. In some embodiments, a processor includes one or more memory components for storing instructions and/or data objects for manipulation. Additionally or alternatively, in some embodiments, a processor is configured to communicate with one or more memory devices for retrieving instructions and/or storing and retrieving data objects for manipulation. Non-limiting examples of processors include specially configured processing circuitry, a microprocessor, a central processing unit ("CPU"), a digital signal processor ("DSP"), and/or a combination thereof.

The term "image frame multiplexer" refers to computing hardware, software, firmware, and/or a combination thereof, for selecting between various image data objects received as input signals, where the selected image data object is outputted by the image frame multiplexer. In some embodiments, an image frame multiplexer is controlled by a control signal, referred to as a "frame selection signal," that indicates which of the input data objects is to be selected for outputting. In some embodiments, the frame selection signal is received from an associated processor, for example a processor to which the selected image frame data object is to be outputted. In other embodiments, an image frame multiplexer receives the frame selection signal from a computing device and/or computing hardware alternative to the processor configured to receive the outputted image data object. In at least some embodiments, the image frame multiplexer is embodied by switch hardware connecting multiple input lines to a single output line, and that receives a signal for selecting one of the input lines for outputting via the output line. In some embodiments, the image frame multiplexer is embodied entirely in software for controlling the flow of a selected image sensor to a processor for processing.

The term "image size" refers to data values representing dimensional properties of an image data object. In the context of two-dimensional images, an image size represents a particular width-height resolution of an image data object as defined by a specific number of columns and rows. Each row-column pair represents a separate data value in a corresponding image data object. For example, a "1920× 1200" image size refers to a 1920×1200 resolution having 1920 columns of data and 1200 rows of data. It should be appreciated that, in some embodiments, one or more image sizes are associated with a particular aspect ratio, which may be shared or different between two image sizes.

The term "full frame image data object" refers to image data captured by an image sensor. The full frame image data object is associated with a "full frame image size" that refers to the image size of the full frame image data object. In some embodiments, an image sensor is configured utilizing a single mode to capture a full frame image data object of a particular full frame image size. In other embodiments, an image sensor is configured to enable selection from a plurality of modes, each associated with adjusting the full frame image size, such that the full frame image data objects captured by the image sensor are of the adjusted full frame image size for the set mode.

The term "middle frame image data object" refers to image data object generated based on a captured full frame image data object and a middle frame image size. A middle frame image data object is generated from a full frame image data object based on the difference between the full frame image size for the full frame image data object and the middle frame image size. In some embodiments, a middle frame image data object includes a cropped portion of the corresponding full frame image data object to reduce the number of rows and/or columns from the full frame image size and the middle frame image size, and/or padding data to increase the number of rows from the full frame image size to the middle frame image size.

The term "image sensor" refers to computing hardware for capturing image data embodied by a corresponding full frame image data object. An image sensor is configured for capturing image data based on a particular full frame image size (e.g., a pixel count associated with the image sensor). Additionally, in some embodiments, the term "image sensor" additionally refers to supporting circuitry/hardware, firmware, and/or software for configuring the data captured and/or output by the image sensor. For example, the term "image sensor" may additionally refer to supporting circuitry for generating a middle frame image data object from a captured full frame image data object, and/or subsequently outputting the middle frame image data object. Non-limiting examples of image sensors include the AR0234 global shutter monochrome sensor (1920×1200 active-pixel array resolution, 3 um pixel), and the AR0144 global shutter monochrome sensor (1280×800 active-pixel array resolution, 3 um pixel), both manufactured by ON Semiconductor® headquartered in Phoenix, Ariz. The term "resolution," when used herein in reference to an image sensor, refers to the active-pixel array resolution for the corresponding image sensor. When used here in reference to one or more image data objects, the term "resolution" refers to a number of data rows and a number of data columns represented by the image data object. It should be appreciated that the resolution of one or more image data objects may be dependent on the resolution of a corresponding image sensor.

Example Apparatuses and Data Flow

FIG. 1 illustrates an example apparatus in accordance with at least one example embodiment of the present disclosure. Specifically, FIG. 1 illustrates an example middle frame imaging apparatus, specifically a dual-sensor middle frame imaging apparatus, in accordance with at least one example embodiment of the present disclosure. As depicted, the middle frame imaging apparatus 100 includes an image frame multiplexer 104 and a processor 106. Additionally, the middle frame imaging apparatus 100 includes a plurality of image sensors 102A-102N (collectively "image sensors 102"). It should be appreciated that, in various embodiments, the middle frame imaging apparatus 100 includes any number of image sensors 102. For example, in some embodiments, the middle frame imaging apparatus 100 includes two image sensors (e.g., image sensor 102A and image sensor 102B) for use in capturing image data for processing. Alternatively, in other embodiments, the middle frame imaging apparatus 100 embodies a tri-sensor imaging apparatus having three image sensors (e.g., image sensor 102A, image sensor 102B, and an additional image sensor not depicted). In yet other embodiments, the middle frame imaging apparatus 100 includes four or more image sensors.

Each of the image sensors 102 embodies a computing device that is configured to capture image data from the environment of the middle frame imaging apparatus 100. Further, each of the image sensors 102 is configured to capture image data of a particular resolution/size. In this regard, each of the image sensors 102 is configured to capture a full frame image data object having a corresponding full frame image size. It should be appreciated that each of the image sensors 102 may be coupled with optical components (including, without limitation, one or more lenses, windows, reflective components, refractive components, or the like) to enable capture of image data associated with a particular field. Further, it should be appreciated that each of the image sensors 102 may be embodied by computing hardware configured to capture such image data using any known methodologies including, without limitation, charge-couple device ("CCD") and complementary metal oxide semiconductor ("CMOS") sensor devices, equivalents thereof, or any combination thereof.

In some embodiments, each of the image sensors 102 is configured to generate a middle frame image data object for outputting. In this regard, in some embodiments, each of the image sensors 102 is configured to store, retrieve, and/or otherwise access a middle frame image size for use in generating a middle frame image data object. Each of the image sensors 102 may be configured by another component of the middle frame imaging apparatus 100, for example the processor 106, or by external computing hardware, software, and/or firmware (not depicted). In some embodiments, a subset of the image sensors 102 is configured for generating and/or outputting a middle frame image data object, for example where the image sensor 102A is configured for outputting a full frame image data object of a particular full frame image size, and the remaining image sensors 102 are configured for outputting middle frame image data objects of a middle frame image size that matches the full frame image size.

In some embodiments, each of the image sensors 102 is configured to capture a full frame image data object associated with various different full frame image sizes. In other embodiments, one or more image sensors are configured to capture full frame image data objects of the same full frame image size. In this regard, each of the image sensors 102 may be associated with capturing image data from different depths of a particular environment (e.g., a near-field and a far-field), different portions of the same field, or different environments representing two different fields.

In yet some other embodiments, each the image sensors 102 is configured to capture the middle frame image data object. In this regard, the image sensor may be configured based on a middle frame image size to capture a particular region of interest, and output the captured data alone or together with additional data rows and/or additional data columns, for example in the form of image padding data. In this regard, each configured image sensor of the image sensors 102 is configured for outputting the middle frame image data object without required post-processing steps for manipulating captured image data, for example such that manipulating by cropping and/or padding a captured full frame image data object is not required.

In some embodiments, one or more of the image sensors 102 is/are configured to enable activation of various modes, each mode associated with capturing and/or outputting different a different image data object. In some embodiments, one or more of the image sensors 102 is/are configured for enabling activation of different modes for capturing full frame image data objects of different full frame image sizes. Additionally or alternatively, in some embodiments, one or more of the image sensors 102 is/are configured to enable switching between various outputs modes. For example, in some embodiments, one or more of the image sensors 102 is/are configured to enable activation of a first mode for outputting a captured full frame image data object, and a second mode for outputting a middle frame image data object based on the captured full frame image data object.

The image frame multiplexer 104 embodies computing hardware for receiving a plurality of inputs and, based on a control signal, selects one of the plurality of input channels for outputting. For example, in some embodiments, the image frame multiplexer 104 comprises circuitry for receiving data objects outputted by the image sensors 102, and subsequently outputting a selected data object from the various inputs. As illustrated, the image frame multiplexer 104 is configured to receive data outputted by each of the image sensors 102 as the various inputs. In an example context, the image frame multiplexer 104 receives a middle frame image data object from each of the image sensors 102, where each middle frame image data object includes at least a portion of a corresponding full frame image data object captured by the corresponding image sensor of the image sensors 102. The image frame multiplexer 104 is configured for outputting one of the receive image data objects (e.g., one of the middle frame image data objects) based on a frame selection signal received from another computing device, hardware, or the like. In at least one example embodiment, the frame selection multiplexer is configured to receive the frame selection signal from the processor 106, as described herein.

The processor 106 embodies computing hardware, a computing device, or a combination of computing devices, configured to perform various specially programmed operations. In some embodiments, the processor 106 is embodied by processing circuitry configured for performing the operations described herein. In other embodiments, the processor 106 is embodied by a microprocessor. In yet other embodiments, the processor 106 is embodied by a CPU. The processor 106 may include, or otherwise be associated with, one or more memory devices storing instructions representing the various operations described herein, and/or for use in storing and/or receiving data objects and/or other data values for use in one or more operations. The processor 106 may be configured to receive data from the image frame multiplexer 104 (e.g., an outputted image frame data objects), and/or transmit data to the image frame multiplexer 104 (e.g., a frame selection signal). Additionally or alternatively, in some embodiments, the processor 106 is configured to communicate with some or all of the image sensors 102, for example for setting one or more modes and/or configuring the image sensors 102 to generate and output a middle frame image data object based on a particular middle frame image size.

In some embodiments, the image sensor of the image sensors 102 is selected without the image frame multiplexer 104. In some such embodiments, for example, the processor 106 is in direct communication with each of the image sensors 102. In this regard, the output lines from each of the image sensors 102 are connected together, and only one image sensor of the image sensors 102 is activated at a given time (e.g., for one frame). When a particular image sensor is selected, the remaining image sensors of the image sensors 102 may be disabled or otherwise set to a high impedance state. In this manner, embodiments may receive a particular middle frame from a selected sensor of the image sensors 102 without utilizing an image frame multiplexer such as the image frame multiplexer 104. In yet another embodiment, a plurality of image sensors are connected to a plurality of input ports of a processor, such that the plurality of image sensors may be enabled for image capturing, but the data to utilize in processing is selected only from a single input port associated with a selected image sensor. For example, in some such embodiments, the output line from image sensor 102A may be directly connected to a first port of the processor 106, and the output line from image sensor 102B may be directly connected to a second port of the processor 106. The image sensors 102A and 102B may each be configured for capturing middle frame image data objects, and transmitting such middle frame image data objects to the processor 106 over their respective output lines. Further, in some such embodiments, the processor 106 is configured to determine a selected image sensor between the image sensor 102A and the image sensor 102B, and receive a selected middle frame image data object via the appropriate input port corresponding to the selected image sensor. The processor 106 may then processed the received middle frame image data object.

FIG. 2 illustrates components of a middle frame image processing apparatus and a corresponding data flow in accordance with at least some example embodiments of the present disclosure. As illustrated, FIG. 2 depicts various configured hardware components (depicted in solid lines), including image sensor 202A and image sensor 202B, image frame multiplexer 206, and processor 212, that are configured to generate, transmit, and/or receive the various data objects (depicted in dashed or "broken" lines), including middle frame image data object 204A, middle frame image data object 204B, selected image data object 210, and frame selection signal 208. Specifically as illustrated, the image sensors 202A and 202B are communicable with image frame multiplexer 206, for example such that each image sensor is configured to provide a middle frame (e.g., middle frame image data object 204A and middle frame image data object 204B) as input to the image frame multiplexer 206. The image frame multiplexer 206 is further communicable with the processor 212, for example such that the image frame multiplexer 206 is configured for receiving a frame selection signal 208 from the processor 212 and outputting a corresponding output data object (e.g., selected image data object 210) from the various inputs. The particular depicted hardware components 202A, 202B, 206, and 212 may each embody components of a particular imaging apparatus, such as the middle frame imaging apparatus 100. In this regard, similarly named components may be embodied by computing hardware, circuitry, software, and/or firmware described above with respect to the middle frame imaging apparatus 100 depicted and described with respect to FIG. 1.

FIG. 2 illustrates an example dual-sensor environment comprising the image sensor 202A and the image sensor 202B. In one such example embodiment, image sensor 202A embodies a 2.45 megapixel ("MP") sensor and image sensor 202B embodies a 1.0 megapixel sensor. In an example context, a dual-sensor environment is utilized in an apparatus embodying a near-far imaging engine, for example where the image sensor 102A is used to capture a wide image of a near-field for functioning as a near-field image sensor and the image sensor 202B is used to capture a narrow image of a far-field for functioning as a far-field image sensor. In the example context, the image sensor 202A and image sensor 202B may each capture full frame image data objects associated with different full frame image sizes. In some such embodiments, the full frame image sizes each match a particular designed aspect ratio. In other embodiments, the full frame image sizes are each associated with different aspect ratios.

The image sensor 202A and image sensor 202B are each configured for generating and outputting a middle frame image data object from a captured full frame image data object. Specifically, as illustrated, the image sensor 202A is configured for outputting the middle frame image data object 204A, and the image sensor 202B is configured for outputting the middle frame image data object 204B. The generate middle frame image data objects are each associated with a particular middle frame image size that is shared between the image sensors 202A and 202B. In this regard, the image sensor 202A and the image sensor 202B each have been previously configured, for example by the processor 212 and/or external computing hardware, for outputting the middle frame image data objects based on the middle frame image size.

As illustrated, the image sensor 202A is configured to capture a first full frame image data object associated with a first full frame image size represented by (R1, C1), where R1 represents a number of rows in the first captured full frame image data object (referred to as a "full frame row count") and C1 represents a number of columns in the first captured full frame image data object (referred to as a "full frame column count"). The image sensor 202B is configured to capture a second full frame image data object associated with a second full frame image size represented by (R2, C2), where R2 represents the full frame row count for the second captured full frame image data object and C2 represents the full frame column count for the second captured full frame image data object. In this regard, the particular image sizes each represent a resolution P, where P=R*C. In this regard, continuing the example context described above, the first full frame image size represents a first resolution P1, where P1=R1*C1, and the second full frame image size represents a second resolution P2, where P2=R2*C2. Further, where image sensor 202A embodies a 2.45 MP sensor and image sensor 202B embodies a 1.0 MP sensor, it should be appreciated that the first full frame image size represents a first resolution that is greater than the second resolution represented by the second full frame image size, such that P1>P2. In some such example contexts, the first full frame image size and the second full frame image size satisfy the properties R1>=R2 and C1>=C2, where P1>=P2 indicating a higher resolution.

Further, as illustrated, the image sensor 202A and image sensor 202B each generate middle frame image data objects having a shared middle frame image size that represents a resolution that falls between the first resolution defined by the first full frame image size and the second resolution defined by the second full frame image size. In this regard, the middle frame image size may represent a size that decreases the number of rows and/or columns from the larger full frame image size, and increases the number of rows and/or columns from the smaller full frame image size. Returning to the example context described above, where R1>=R2 and C1>=C2 and for example where image sensor 202A is of a higher resolution (e.g., (R1, C1) represents a higher image resolution than (R2, C2)), the middle frame image size may be represented by (Rm, Cm), where Rm represents a number of rows to be included in the middle frame image data object and Cm represents a number of columns to be included in the middle frame image data object. In this regard, the middle frame image data object represents a third middle frame image resolution Pm, where Pm=Rm*Cm. Additionally, the middle frame image size represents a third resolution that falls between resolution represented by the first full frame image size and the resolution represented by the second full frame image size. In this regard, the middle frame image size represented by (Rm, Cm) may be defined so as to satisfy the relationships R1>=Rm>R2 and C1>Cm>=C2, and P1>Pm>P2. Non-limiting examples of middle frame image sizes include (R1, C2) and (R2, C1). In this regard, it should be appreciated that the above identified formulas are merely examples. In some embodiments, the middle frame image size is limited only by the ability of each sensor to pad the number of rows and/or number of columns in an image data object.

In other embodiments, it should be appreciated that a middle frame image size embodies any image size for use in standardizing output across a plurality of image sensors. For example, in some embodiments, the middle frame image size embodies a maximum image size across all image sensors (e.g., where Rm equals the greatest number of rows for any full frame image size, and Cm equals the greatest number of rows for any full frame image size). In yet other embodiments, the middle frame image size embodies a minimum image size across all image sensors (e.g., where Rm equals the smallest number of rows for any full frame image size, and Cm equals the smallest number of rows for any full frame image size). In yet other embodiments still, the minimum frame image size embodies any resolution between the maximum image size and the minimum image size. In some such embodiments, the chosen middle frame image size may be determined by one or more components of the system (e.g., by a processor) or selected via user configuration such that the determined or selected middle frame image size functions for particular hardware restrictions and/or particular image processing tasks.

The image sensors may be configured to output a middle frame image data object based on a desirable middle frame image size. In this regard, the middle frame image size is designed to, based on the various image sensors and processor, leverage the resolution and bandwidth of the various components. Further, the middle frame image size may be designed based on the particular image processing task to be accomplished via the components. In this regard, as the middle frame image size increases, more of the full frame image data object may be included for larger image sensors in exchange for reduction in the transfer speed for the image data objects (e.g., a lower framerate). Similarly, in at least some examples, as the middle frame image size decreases, less of the full frame image data object may be included in exchange for increase in the transfer speed for the image data objects (e.g., a higher framerate).

In the example context, the middle frame image size may represent a particular region of interest within the larger full frame image data object (e.g., a region of interest within the full frame image data object captured by image sensor 202A), and any padding required to increase the number of rows and/or columns in the smaller full frame image data object (e.g., padding the full frame image data object captured by the image sensor 202B). In one specific example context, Rm=R2 and Cm=C1, such that the middle frame image size is represented by (R2, C1), with image sensor 202A capturing a full frame image data object at (R1, C1) and the image sensor 202B capturing a full frame image data object at (R2, C2), where R1>R2 and C1>C2. In this regard, the middle frame image data object 204A may be generated by cropping the full frame image data object captured by image sensor 202A and including the relevant portion of data (e.g., the rows and/or columns of data within the region of interest) such that R1−Rm rows are cropped out, (e.g., with (R1−Rm)/2 cropped out from each of the top and bottom of the captured full frame image data object). Further in this regard, the middle frame image data object 204B may be generated by including the full frame image data object in the middle frame image data object 204B and padding the remaining columns of data (e.g., padding the remaining Cm−C2 columns of data, with (Cm−C2)/2 columns of data padded on each of the left and the right of the middle frame image data object). It should be appreciated that such cropping may be utilized to identify and/or otherwise extract a particular portion of a full frame image data object that represents a region of interest by cropping one or more rows and/or columns of data. Similarly, it should be appreciated that such padding may be included to pad any number of rows and/or columns of the middle frame image data object.

By decreasing the number of rows and/or columns between the full frame image data object and the middle frame image data object 204A (e.g., by cropping a particular portion of the full frame image data object for including in the middle frame image data object 204A), the middle frame image data object 204A may be analyzed with a higher framerate without sacrificing apparatus usability. Further, by increasing the number of rows and/or columns to standardize the middle frame image size enables outputting of image data objects for analysis in a standardized manner without additional post-processing hardware to further configure and/or standardize the image data object formats. Such example advantages enable improvement in image data object analysis throughput and efficacy in a cost effective manner.

After configuring the image sensor 202A and 202B based on a desired middle frame image size, the image sensor 202A and image sensor 202B each generate corresponding middle frame image data objects based on the middle frame image size. For example, as illustrated, the image sensor 202A may generate the middle frame image data object 204A from a captured full frame image data object, the middle frame image data object 204A of the middle frame image size represented by (Rm, Cm). Similarly, the image sensor 202B may generate the middle frame image data object 204B from a second captured full frame image data object, the middle frame image data object 204B also of the middle frame image size represented by (Rm, Cm).

As illustrated, the image frame multiplexer 206 is configured to receive various input channels. Specifically, the image sensor 202A outputs middle frame image data object 204A and the image sensor 202B outputs middle frame image data object 204B, where the image frame multiplexer 206 receives each middle frame image data object. Each of the middle frame image data objects are received via a different input channel, such that any of the input channels may be selected for outputting by the image frame multiplexer 206. The image frame multiplexer 206 is configured for outputting one of the input channels (e.g., either middle frame image data object 204A or middle frame image data object 204B). The image frame multiplexer 206 receives the frame selection signal 208 for controlling the input channel for outputting. For example, as illustrated, the image frame multiplexer 206 outputs the selected image data object 210 based on the frame selection signal 208. The selected image data object 210 embodies one of the data objects received via the input channels (e.g., one of the middle frame image data objects 204A or 204B), specifically the data object received via the selected input channel represented by the frame selection signal 208. In this regard, as illustrated the selected image data object 210 embodies either the middle frame image data object 204A or middle frame image data object 204B.

As illustrated, the processor 212 transmits the frame selection signal 208 to the image frame multiplexer 206. The processor 212 may generate the frame selection signal 208 for transmitting to the image frame multiplexer 206. The processor 212 generates the frame selection signal 208 using a determined and/or predetermined frame selection algorithm. In some embodiments, the processor 212 is configured to utilize a randomized frame selection algorithm, such that for each cycle the generated frame selection signal 208 randomly selects between the input channels (e.g., as illustrated, selects randomly between the middle frame image data object 204A and the middle frame image data object 204B). Alternatively, in other embodiments, the processor 212 is configured to utilize a sequential frame selection algorithm, such that for each cycle the generated frame selection signal 208 selects between the input channels based on a defined sequence (e.g., as illustrated, switching between the middle frame image data object 204A and middle frame image data object 204B each cycle). It should be appreciated that the randomized frame selection algorithm is readily extendible to select from any number of input channels (e.g., randomly select between X received middle frame image data objects in X different channels, where X is a number). Similarly, it should be appreciated that the sequential frame selection algorithm is readily extendible to select from any number of input channels (e.g., sequentially select from X received middle frame image data objects in order before cycling back to the start or reversing directions at each end, where X is a number).

In yet other embodiments, the processor 212 processes one or more received data objects to generate the frame selection signal 208. For example, in some embodiments, to generate the frame selection signal 208, the processor 212 processes the received selected image data object 210 received from the image frame multiplexer 206. The processor 212 may process the selected image data object 210 to determine whether to continue utilizing the same value for the frame selection signal 208, or to change the value to select a different input channel. For example, in some embodiments, the processor 212 processes the selected image data object 210 to determine whether the data object includes image data sufficient for performing a particular image processing task. In some such embodiments, in a circumstance where the processor 212 determines the selected image data object 210 includes sufficient data, for example by successfully processing the image data and successfully completing at least one iteration or operation of a corresponding image processing task, the frame selection signal 208 may remain unchanged so that subsequent selected image data objects are received via the same input channel since such image data objects are sufficient for the task. Alternatively in some such embodiments, in a circumstance where the processor 212 determines the selected image data object 210 does not include sufficient data, the frame selection signal 208 may be changed to select a different input channel. In some embodiments, the changed value is generated based on a randomized frame selection algorithm or a sequential frame selection algorithm, as described above, upon such a determination. Alternatively, in some other embodiments, the changed value for the frame selection signal 208 is generated based on the selected image data object 210, for example to predict an input channel that would perform best for the image processing task based on the analysis of the selected image data object 210. It should be appreciated that such predictive analysis may utilize a predictive algorithm, machine learning model, or other image processing algorithm. For example, in at least one embodiment, the processor is configured to process the selected image data object 210 to determine the selected image data object 210 does not include sufficient information for completing the corresponding image processing task, and to identify a middle frame image data object associated with a different image sensor predicted to include sufficient information (e.g., an image sensor of a greater full frame, or an image sensor of a smaller full frame image size). Additionally or alternatively, in some embodiments, even when the processor successfully completes an image processing task, the processor is configured Further, it should be appreciated that any such algorithm for generating the frame selection signal 208 based on processing the selected image data object 210 is extendable to generating an image selection signal for selecting from any number of input channels associated with any number of image sensors.

Additionally or alternatively to generate the frame selection signal 208, in some embodiments, the processor 212 is configured for performing a desired image processing task. For example, as illustrated, the processor 212 is configured to receive, from the image frame multiplexer 206, the selected image data object 210 for processing associated with one or more image processing tasks. In an example context, the processor 212 is configured to process the selected image data object 210 using one or more dimensioning algorithms (e.g., for determining volumetric dimensions of an object), visual indicia detection algorithms (e.g., for barcode scanning and/or decoding), object detection algorithms, and/or the like. Additionally or alternatively still, in some embodiments, the processor 212 is configured to perform one or more actions based on the results of processing the selected image data object 210, and/or transmit the results of processing and/or transmit the selected image data object 210 to one or more other components upon completion (e.g., a display or other processing hardware, not depicted).

Examples of Middle Frame Image Data Objects with Outputting and Selecting

Having thus described an example apparatus, components, and data flow for example embodiments of the present disclosure, visualizations of middle frame image data object generation and outputting will now be described. It should be appreciated that the visualizations described include a number of non-limiting example middle frame image data objects that may be generated and/or output by the apparatuses and components described above with respect to FIG. 1 and/or FIG. 2.

FIG. 3 illustrates an example visualization of the functionality of an image frame multiplexer for selecting a middle image data object in a dual-sensor environment, in accordance with at least some example embodiments of the present disclosure. In this regard, the example visualization provides an exemplary visualization of the middle frame image data object selection process described above with respect to FIG. 2. It should be appreciated that the specific image sizes and variable values illustrated in FIG. 3 are merely exemplary, and do not to limit the scope and spirit of the embodiments described herein.

As such, FIG. 3 illustrates a first full frame image data object 302 and a second full frame image data object 304. Specifically, the first full frame image data object 302 is of a full frame image size represented by the full frame column count 302A and the full frame row count 302B. In this regard, as illustrated, the first full frame image data object 302 is of a 1920×1200 resolution, where the full frame column count 302A equals 1920 and the full frame row count 302B equals 1200. Similarly, the second full frame image data object 304 is of a full frame image size represented by the full frame column count 304A and the full frame row count 304B. In this regard, as illustrated, the second full frame image data object 304 is of a 1280×800 resolution, where the full frame column count 304A equals 1280 and the full frame row count 304B equals 1200. It should be appreciated that a first image sensor (not depicted) may be configured to capture the first full frame image data object 302 and a second image sensor (not depicted) configured to capture the second full frame image data object 304

The image sensors configured to capture the first full frame image data object 302 and second full frame image data object 304 may each be configured based on a particular middle frame image size. Specifically, each image sensors may be configured based on a middle frame image size that is shared between the two image sensors, the middle frame image size represented by the middle frame column count 310A and the middle frame row count 310B. In this regard, the middle frame image size is of a 1920×800 resolution, where the middle frame column count 310A equals 1920 (equal to the full frame column count 302A for the first full frame image data object 302) and the middle frame row count 310B equals 800 (equal to the full frame row count 304B for the second full frame image data object 304). As such, the middle frame image size represents a resolution between the 1920×1200 resolution for the first full frame image data object 302 and the 1280×800 resolution for the second full frame image data object 304.

As illustrated, the middle frame image size may be utilized to generate the first middle frame image data object 306 and second middle frame image data object 308. Specifically, the image sensor (not depicted) configured to capture the first full frame image data object 302 may be configured to generate and output the first middle frame image data object 306 based on the middle frame image size. In this regard, the first middle frame image data object 306 may be generated by cropping and/or padding the first full frame image data object 302 as needed to match the full frame image size. As illustrated, the first full frame image data object 302 includes more rows than can be included in the middle frame image size, and thus a particular portion of the first full frame image data object 302 may be cropped for including in the first middle frame image data object 306. Specifically, as illustrated the first full frame image data object 302 includes 400 more rows than the middle frame row count 310B allows for, and thus 200 rows may be cropped from the top and bottom of the first full frame image data object 302 (indicated by the dashed or "broken" lines) to identify the portion of data for including in the corresponding first middle frame image data object 306. As illustrated, no columns are cropped or padded because the column counts 302A and 310A match. As such, the first middle frame image data object 306 is embodied by the region of interest embodied by the identified portion of data after cropping the first full frame image data object 302.

Similarly, the image sensor (not depicted) configured to capture the second full frame image data object 304 may be configured to generate and output the second middle frame image data object 308 based on the middle frame image size. In this regard, the second middle frame image data object 308 may be generated by cropping and/or padding the second full frame image data object 304 as needed to match the full frame image size. As illustrated, the full frame image data object includes less columns than are included in the middle frame image size, and thus additional column padding must be included in the second middle frame image data object 308. Specifically, the second full frame image data object 304 includes 640 fewer roads than the middle frame column count 310A requires. As such, a column padding of 640 may be identified for including in the second middle frame image data object 308, specifically with 320 columns of padding data on the left and 320 columns of padding data on the right of the image data. As illustrated, no rows are cropped or padded because the row counts 304B and 310B match. As such, the second middle frame image data object 308 is embodied by the second full frame image data object 304 with sufficient column padding data.

As illustrated, each of the first middle frame image data object 306 and the second middle frame image data object 308 are each outputted to the image frame multiplexer 206. Specifically, the first middle frame image data object 306 is outputted (for example, by a first image sensor not depicted) to the image frame multiplexer 206 in a first input channel assigned the channel value 0. Similarly, the second middle frame image data object 308 is outputted (for example, by a second image sensor not depicted) to the image frame multiplexer 206 in a second input channel assigned the channel value 1.

The image frame multiplexer 206 is configured to receive the frame selection signal 208, for example from a processor (not depicted). The frame selection signal 208 embodies the value of one of the input channels, such that the frame selection signal 208 represents the input channel selected for outputting by the image frame multiplexer 206. As illustrated, the frame selection signal 208 represents a value of 0, indicating selection of the input channel represented by value 0 for outputting by the image frame multiplexer 206. As such, the image frame multiplexer 206 outputs the data object received via the first input channel represented by channel 0. As such, the frame selection signal 208 may be changed to select whether to output the first middle frame image data object 306 or the second middle frame image data object 308 without activating and/or deactivating any corresponding image sensors.

It should be appreciated that, in some embodiments, the selected middle frame image data object may analyzed to determine the channel and/or image sensor from which the data originated. For example, in embodiments where the selected middle frame image data object is output to a processor, the processor may identify the image sensor from which the selected middle frame image data object originated based on the amount of padding data. For example, as illustrated, the first middle frame image data object 306 may be processed to determine that the first middle frame image data object 306 originated from a first image sensor based on the existence of no padding data. Similarly, had the second middle frame image data object 308 been selected for outputting, the processor may identify the padding data within the second middle frame image data object 308 to determine the data object originated from a second image sensor. In some such embodiments, the processor may store and/or otherwise access information associated with each image sensor for making such determination (e.g., a full frame image size associated with each image sensor). It should be appreciated that such processing may be utilized to identify a middle frame image data object originated from any of a number of image sensors, for example as described below with respect to FIG. 4.

FIG. 4 illustrates a plurality of full frame image data objects and corresponding middle frame image data objects, each associated with a particular middle frame image size shared amongst the middle frame image data objects. In this regard, FIG. 4 may be associated with a multi-sensor environment, such that each of the full frame image data objects depicted are captured by a different image sensor configured to generate the corresponding middle frame image data object for outputting to an image frame multiplexer. It should be appreciated that the number of full frame image data objects and corresponding middle frame image data objects, as well as the depicted image sizes, are merely exemplary.

FIG. 4 depicts a plurality of full frame image data objects 402A-402D, each of a different resolution. The full frame image data objects 402A-402D are each associated with a corresponding middle frame image data object of a plurality of middle frame image data objects 404A-404D. Each of the middle frame image data objects 404A-404D are associated with a shared middle frame image size. Specifically, the middle frame image size is of a 1920×1050 resolution, having a middle frame column count of 1920 and a middle frame row count of 1050. In this regard, each of the middle frame image data objects 404A-404D may be generated by cropping data from the corresponding full frame image data object and/or padding data from the corresponding full frame image data object.

For example, FIG. 4 depicts a first full frame image data object 402A and corresponding first middle frame image data object 404A. The first full frame image data object 402A is of a first full frame image size, represented by a first full frame column count of 1920 and a first full frame row count of 1200. As such, the first full frame image data object is associated with a full frame column count that matches the middle frame column count, such that no padding or cropping is required in this direction. The first full frame image data object 402A is associated with a full frame row count that exceeds the middle frame row count (1200 compared to 1050). Accordingly, the first middle frame image data object 404A includes a cropped image data portion 406A, where the cropped image data portion 406A includes a data portion the first full frame image data object 402A after cropping a number of data rows (indicated by the area cropped by the dashed or "broken" lines as depicted). Specifically, the cropped image data portion 406A includes the data of the first full frame image data object 402A with 75 rows cropped from each of the top and the bottom of the first full frame image data object 402A (e.g., such that the total cropped rows equals the difference between the two row counts of 150).

Further, for example, FIG. 4 depicts a second full frame image data object 402B and corresponding second middle frame image data object 404B. The second full frame image data object 402B is of a second full frame image size, represented by a second full frame column count of 1680 and a second full frame row count of 1050. As such, the second full frame image data object 402B is associated with a full frame row count that matches the middle frame row count, such that no row padding or cropping is required in this direction. The second full frame image data object 402B is associated with a full frame column count that is less than the middle frame column count (1680 compared to 1920). Accordingly, the second middle frame image data object 404B includes the second full frame image data object 402B together with necessary image data padding 406B for the additional columns. Specifically, the second middle frame image data object 404B includes the second full frame image data object 402B together with image data padding 406B of 120 columns of padded data on each of the left and right of the second full frame image data object 402B (e.g., such that the total image data padding 406B equals the difference between the two column counts of 240).

Further, for example, FIG. 4 depicts a third full frame image data object 402C and corresponding third middle frame image data object 404C. The third full frame image data object 402C is of a third full frame image size, represented by a third full frame column count of 1440 and a third full frame row count of 900. The third full frame image data object 402C is associated with a full frame column count that is less than the middle frame column count (1440 compared to 1920). Additionally, the third full frame image data object 402C is associated with a full frame row count that is less than the middle frame row count (900 compared to 1050). Accordingly, the third middle frame image data object 404C includes the third full frame image data object 402C together with necessary image data padding 406C for the additional columns and rows. Specifically, the third middle frame image data object 404C includes the third full frame image data object 402C together with image data padding 406C for 240 columns of padded data on each of the left and right of the third full frame image data object 402C (e.g., such that the total padded columns of the image data padding 406C equals the difference between the two column counts of 480) and 150 rows of padded data on each of the top and bottom of the third full frame image data object 402C (e.g., such that the total padded rows of the image data padding 406C equals the difference between the two row counts of 300).

Further, for example, FIG. 4 depicts a fourth full frame image data object 402D and corresponding fourth middle frame image data object 404D. The fourth full frame image data object 402D is of a fourth full frame image size, represented by a fourth full frame column count of 1280 and a fourth full frame row count of 800. The fourth full frame image data object 402D is associated with a full frame column count that is less than the middle frame column count (1280 compared to 1920). Additionally, the fourth full frame image data object 402D is associated with a full frame row count that is less than the middle frame row count (800 compared to 1200). Accordingly, the fourth middle frame image data object 404D includes the fourth full frame image data object 402D together with necessary image data padding 406D for the additional columns and rows. Specifically, the fourth middle frame image data object 404D includes the fourth full frame image data object 402D together with image data padding 406D for 320 columns of padded data on each of the left and right of the fourth full frame image data object 402D (e.g., such that the total padded columns of the image data padding 406D equals the difference between the two column counts of 640) and 200 rows of padded data on each of the top and bottom of the fourth full frame image data object 402D (e.g., such that the total padded rows of the image data padding 406D equals the difference between the two row counts of 400).

Each of the middle frame image data objects 404A-404D may be outputted by a corresponding image sensor to an image frame multiplexer for selecting. Similarly, it should be appreciated that each of the middle frame image data objects 404A-404D may be processed to identify the image sensor that originated the middle frame image data object. For example, by determining the number of padded rows and padded columns in a particular middle frame image data object, a processor could determine the resolution of the original image from a known set of resolutions, each resolution associated with a particular image sensor. In this regard, the middle frame image data object could be used in generating a new frame selection signal, or in requesting data directly from the corresponding image sensor (e.g., requesting a full frame image data object from a sensor when the processor determines a middle frame image data object is missing important data, for example due to cropping).

It should be appreciated that, in other embodiments, middle frame image data objects may be associated with a different middle frame image size. For example, in some embodiments, the middle frame image size may represent the greatest number of rows and columns of all the full frame image sizes (e.g., 1920×1200 as illustrated), such that each middle frame image data object may be generated by padding each of the smaller full frame image data objects in each direction. Further, In yet other embodiments, the middle frame image size may represent the smallest number of rows and columns of al the full frame image sizes (e.g., 1280×800 as illustrated), such that each middle frame image data object may be generated by cropping a particular region of each smaller full frame image data object.

Example Processes for Middle Frame Image Processing

Having described various example apparatuses, components, data flows, and various example full frame image data objects with corresponding middle frame image data objects according to example embodiments of the present disclosure, example processes are depicted for image processing utilizing middle frame image data objects (referred to as "middle frame image processing"). In this regard, it should be appreciated that the processes described herein may be implemented as computer-implemented processes via the apparatuses and/or specific components described herein. Additionally or alternatively, it should be appreciated that the described processes may include one or more optional operations (depicted in dashed or "broken" lines). In some embodiments, none, some, or all of the optional operations are performed within the described processes.

FIG. 5 illustrates an example flowchart including example operations for middle frame image processing, in accordance with at least some example embodiments of the present disclosure. The example operations embody a process (or "method") 500. In some embodiments, it should be appreciated that the example operations embody a computer-implemented process to be performed by an apparatus, for example the middle frame imaging apparatus 100 described with respect to FIG. 1 above, and/or by one or more hardware components, for example those described with respect to FIG. 2 above.

At optional block 502, the process 500 includes configuring, by a processor, at least one of a plurality of image sensors based on a middle frame image size. In this regard, the processor may configure the at least one image sensor for generating and outputting a middle frame image data object based on the middle frame image size. In some embodiments, at optional block 502, all of the plurality of image sensors are configured. In other embodiments, only a subset of the plurality of image sensors are configured, for example where one or more image sensors capture full frame image data objects associated with a full frame image size that matches the middle frame image size. In some embodiments, the plurality of image sensors are configured utilizing the process described below with respect to FIG. 7. In yet other embodiments, computing hardware other than the processor is utilized to configure at least one (or all) of the plurality of image sensors, for example external computing hardware.

At block 504, the process 500 includes outputting, from a plurality of image sensors to an image frame multiplexer, a plurality of middle frame image data objects. Each of the plurality of middle frame image data objects are associated with a middle frame image size, such that each image sensor of the plurality of image sensors generates a middle frame image data object of the middle frame image size regardless of the full frame image size for full frame image data objects captured by each image sensor. In some embodiments, each image sensor outputs a corresponding middle frame image data object to a different input channel of the image frame multiplexer. It should be appreciated that, in at least some embodiments, the plurality of image sensors is embodied by the same plurality of image sensors configured at optional block 502. In some embodiments, block 504 includes setting each of the plurality of image sensors to a specific mode to cause the plurality of image sensors to output a middle frame image data object. In some embodiments, the processor is configured to connect the plurality of image sensors directly to configure the sensor region of interest. Additionally or alternatively, in some embodiments, the processor and/or each image sensor is configured to capture a full frame image data object and subsequently crop and/or pad the image data based on one or more software implementations.

At block 506, the process 500 includes selecting, by the image frame multiplexer, a selected middle frame image data object from the plurality of middle frame image data objects. In some such embodiments, the image frame multiplexer receives a frame selection signal for selecting a particular input channel, each input channel associated with one of the received middle frame image data objects. In this regard, the image frame multiplexer is configured to select the input channel based on the frame selection signal, identify the middle frame image data object associated with the selected input channel, and output the identified middle frame image data object. For example, the image frame multiplexer may receive the frame selection signal from the processor for selecting the selected middle frame image data object from the plurality of middle frame image data objects, based on the frame selection signal, by switching to enable only a single input channel to connect to the output channel. By selecting the selected middle frame image data object, the image frame multiplexer is configured to output the selected middle frame image data object via an output channel. In other embodiments, the image frame multiplexer receives the frame selection signal from controller hardware that is configured to generate and/or otherwise transmit the frame selection signal to the image frame multiplexer. In some embodiments, the controller hardware associated with the image frame multiplexer is communicable with the processor to receive updating signals and/or determine the value of the frame selection signal and/or determine when to update the frame selection signal. In other embodiments, the controller hardware associated with the image frame multiplexer is independent from the processor.

At block 508, the process 500 includes receiving, by the processor, the selected middle frame image data object from the image frame multiplexer. In this regard, the processor may be connected to receive data objects outputted through the output channel of the image frame multiplexer. It should be appreciated that, in this regard, the image frame multiplexer may transmit the selected middle frame image data object to the processor over any of a myriad of known communication methods, including through a hardwired connection, an alternative wired connection, and/or a wireless connection.

At block 510, the process 500 includes processing, by the processor, the selected middle frame image data object. In some such embodiments, the processor is configured to process the selected middle frame image data object utilizing any of a number of image processing algorithms. The processor may process the selected middle frame image data object for any of a number of purposes. For example, in some embodiments, the processor may process the selected middle frame image data object for a particular image processing task. Additionally or alternatively, in some embodiments, the processor may process the selected middle frame image data object to determine if important data is missing from the selected middle frame image data object (e.g., due to cropping) for purposes of determining whether to request a full frame image data object. Additionally or alternatively, in some embodiments, the processor may process the selected middle frame image data object for updating a frame selection signal. It should be appreciated that each processing task may be performed utilizing any number of computer-implemented algorithms.

At optional block 512, the process 500 includes updating, by the processor, a frame selection signal controlling the image frame multiplexer. The processor may generate an updated frame selection signal based on one or more frame selection algorithms. For example, in some embodiments, the processor is configured for updating the frame selection signal utilizing a randomized frame selection algorithm or a sequential frame selection algorithm. Additionally or alternatively, in some embodiments, the processor is configured for updating the frame selection signal based on results of processing the selected middle frame image data object. For example, in some embodiments, the processor processes the selected middle frame image data object to determine whether the data therein is sufficient for an image processing task, and/or whether another image sensor associated with a different input channel is predicted to provide a more useful image. In this regard, based on such analysis, the processor may update the frame selection signal to reflect the input channel predicted to receive more useful data. In other embodiments, the processor is configured to update controller hardware associated with the image frame multiplexer to cause the controller hardware to update the frame selection signal.

FIG. 6 illustrates an example flowchart including example additional operations for middle frame image processing, specifically for requesting and processing a selected full frame image data object associated with a selected middle frame image data object, in accordance with at least some example embodiments of the present disclosure. The example operations embody a process (or "method") 600. In some embodiments, it should be appreciated that the example operations embody a computer-implemented process to be performed by an apparatus, for example the middle frame imaging apparatus 100 described with respect to FIG. 1 above, and/or by one or more hardware components, for example those described with respect to FIG. 2 above.

In at least some embodiments, the process 600 occurs after one or more blocks of the process 500. In this regard, the process 600 may begin after block 510 or optional block 512, as described with respect to FIG. 5. In at least some embodiments, the process 600 occurs as a result of processing the middle frame image data object, at block 510, to make one or more determinations. For example, in some embodiments, the process 600 occurs in response to processing the selected middle frame image data object, by the processor, to determine useful data is missing from the selected middle frame image data object (e.g., data required and/or helpful in efficiently or effectively completing an image processing task has been cropped out).

At block 602, the process 600 includes identifying, by the processor, a selected image sensor from the plurality of image sensors. The processor identifies the selected image sensor based at least on the selected middle frame image data object. For example, in some embodiments, the processor identifies the selected image sensor based on padding data and/or image data within the selected middle frame image data object, where such data is utilized to link the selected middle frame image data object to a resolution associated with the selected image sensor. In some embodiments, the processor is configured to store and/or otherwise access resolution data, configuration data, and/or other information associated with each of the plurality of image sensors for use in identifying the selected image sensor based on the selected middle frame image data object. In some embodiments, the processor is configured to communicate with each of the plurality of image sensors directly to receive resolution data, configuration data, and/or the like, for comparison with the selected middle frame image data object. In some other embodiments, the processor is configured to communicate with a data storage (e.g., a memory device) to retrieve such data.

At block 604, the process 600 includes transmitting, by the processor, a full frame request signal to the selected image sensor. The full frame request signal includes specially configured information that indicates a request to receive the full frame image data object associated with the selected middle frame image data object, or a subsequently captured full frame image data object, from the selected image sensor. In some embodiments, the processor transmits the full frame request signal directly (e.g., through one or more wired connections between the selected image sensor and the processor). In other embodiments, the processor transmits the full frame request signal indirectly through one or more intermediate components.

In some embodiments, the full frame request signal is configured to cause the selected image sensor to transmit the full frame request signal from a buffer, temporary memory, or permanent storage. In other embodiments, the full frame request signal is configured to cause the selected image sensor to transmit a subsequently captured full frame image data object. Additionally or alternatively, in some embodiments, the full frame request signal causes the selected image sensor to change one or more modes that facilitate the transmission of the full frame image data object. For example, in some embodiments, the full frame request signal causes the selected image sensor to change an output mode to a mode that causes output of a captured full frame image data object instead of a corresponding middle frame image data object. Such a mode may persist until a subsequent signal is received, for a limited amount of time, or for a number of captures.

In some embodiments, the full frame request signal causes reconfiguration of the selected image sensor for outputting a full frame image data object rather than a middle frame image data object. For example, in this regard, the full frame request signal may re-format the selected image sensor based on a full frame image size. In some embodiments, the selected image sensor is caused to capture the full frame image data object after reconfiguring of the selected image sensor.

At block 606, the process 600 includes receiving, by the processor, a selected full frame data object from the selected image sensor. It should be appreciated that the full frame image data object includes more data the selected middle frame image data object. In this regard, in at least one example context, the full frame image data object includes image data previously cropped when generating the selected middle frame image frame data object. In other embodiments, the full frame image data object includes a new full frame image data captured by the selected image sensor. As such, the selected full frame image data object may include data useful for the image processing task being performed by the processor, where the useful data was previously cropped out. In this regard, in circumstances where the middle frame image data object is insufficient for successfully (or effectively) accomplishing the image processing task, the corresponding selected full frame image may be received and processed for such purposes. In some circumstances, if the number of full frame request signals being made exceeds a particular threshold, the middle frame image size may need to be increased to best accomplish the image processing task. In some such embodiments, the processor may automatically perform such middle frame image size reconfiguration, or an operator may perform such middle frame image size reconfiguration.

In some embodiments, the processor receives the selected full frame image data object via the image frame multiplexer. For example, in some embodiments, upon transmitting the full frame request signal (e.g., at block 604), the processor configures the image frame multiplexer to continue to output from the input channel associated with the selected image sensor, such that the image frame multiplexer continues outputting data from the input channel associated with the selected image sensor for the duration of the frame capture. In this regard, the image frame multiplexer continues outputting the full frame image data object from the selected image sensor until the selected full frame image data object is received and/or processed by the processor.

At block 608, the process 600 includes processing, by the processor, the selected full frame image data object. In doing so, the processor is able to perform the image processing task based on all captured data, such that the previously cropped data is restored and may be used in the analysis. In this regard, processing the selected full frame image data object may enable successfully accomplishing the image processing task, or improve the accuracy of such results. By minimizing the number of times a selected full frame image data object is requested (and thus, relying on the middle frame image data object where practical) embodiments of the present disclosure can maintain an improved average throughput while enabling access to the full frame image data object in circumstances that would otherwise result in errors or diminished efficiency and/or efficacy.

FIG. 7 illustrates an example flowchart including example additional operations for middle frame image processing, specifically for configuring one or more image sensors based on a middle frame image size, in accordance with at least some example embodiments of the present disclosure. The example operations embody a process (or "method") 700. In some embodiments, it should be appreciated that the example operations embody a computer-implemented process to be performed by an apparatus, for example the middle frame imaging apparatus 100 described with respect to FIG. 1 above, and/or by one or more hardware components, for example those described with respect to FIG. 2 above.

In at least some embodiments, the process 700 occurs after, or in place of, one or more blocks of the process 500. In this regard, the process 700 may occur in place of optional block 502 described above with respect to FIG. 5. Upon completion of the process 700, or a subset of the operations therein, flow may continue to one or more other operations of another process. For example, as illustrated, flow may return to block 504 of the process 500, as described above with respect to FIG. 5.

At block 702, the process 700 includes identifying, by the processor, a plurality of full frame image sizes associated with a plurality of image sensors. In some embodiments, the processor is directly communicable with each of the plurality of image sensor. In some such embodiments, the processor may request resolution data representing the full frame image sizes from each of the plurality of image sensors. Additionally or alternatively, in some embodiments, the processor is configured to identify a full frame image size for each of the plurality of image sensors by receiving a full frame image data object from a corresponding image sensor, directly or indirectly through one or more other components (e.g., an image frame multiplexer), and determining the full frame image size from each full frame image data object. In yet other embodiments, the processor accesses the plurality of full frame image sizes from a temporary or permanent data storage (e.g., embodied by one or more memory devices).

At block 704, the process 700 includes determining, by the processor, a largest image size based on the plurality of full frame image sizes. Similarly, at block 706, the process 700 includes determining, by the processor, a smallest image size based on the plurality of full frame image sizes. In some embodiments, the processor is configured for determining the largest image size and/or smallest image size based on comparison between the various full frame image sizes of the plurality of full frame image sizes. It should be appreciated that any known algorithms for determining the largest and/or smallest image size of a plurality of image sizes may be utilized to determine the smallest image size and/or largest image size from the plurality of full frame image sizes.

At block 708, the process 700 includes generating, by the processor, the middle frame image size based on the largest image size and the smallest image size. In some embodiments, the middle frame image size is generated to fall between the largest image size and the smallest image size and based on a desired throughput and/or image processing task. In this regard, for example, a middle frame row count may be generated based on the full frame row count for the largest image size, and the middle frame column count may be generated based on the full frame column count for the smallest image size (or the reverse), where the middle frame row count and middle frame column count form the middle frame image size. In other embodiments, the middle frame image size is selected based on the row count and/or column count of one or more intermediary image sizes of the plurality of full frame image sizes (e.g., full frame image sizes between the largest image size and the smallest image size).

In yet other embodiments, the largest full frame image size of any image sensor is utilized as a middle frame image size. In some such embodiments, each other image sensor of a plurality of image sensors may be configured to pad a captured image data object to extend the captured image data object to match the middle frame image size. In other embodiments, the smallest full frame image size of any image sensor is utilized as a middle frame image size. In some such embodiments, each other image sensor of a plurality of image sensors may be configured to crop a relevant portion of captured image data to match the middle frame image size in one or more directions.

At block 710, the process 700 includes configuring, by the processor, the at least one of the plurality of image sensors to output a middle frame image data object based on the middle frame image size. In some embodiments, the processor transmits the middle frame image size to each of the at least one of the plurality of image sensors, and/or transmits a configuration signal indicating the data received should be used for setting one or more modes and/or storing for use in generating future middle frame image data objects. For example, in some embodiments, each image sensor is configured to activate a particular output mode associated with outputting middle frame image data objects in response to receiving the middle frame image size. Additionally or alternatively, each image sensor that receives the middle frame image size stores the middle frame image size for use in subsequent middle frame image data object generation.

FIG. 8 illustrates an example flowchart including example additional operations for middle frame image processing, specifically for generating and outputting a middle frame image data object, in accordance with at least some example embodiments of the present disclosure. The example operations embody a process (or "method") 800. In some embodiments, it should be appreciated that the example operations embody a computer-implemented process to be performed by an apparatus, for example the middle frame imaging apparatus 100 described with respect to FIG. 1 above. For example, in some embodiments, the operations depicted with respect to FIG. 8 are performed by an image sensor, and/or corresponding support circuitry, of a middle frame imaging apparatus. It should be appreciated that each image sensor of a plurality of image sensors may be configured to perform the process 900 independent from the other image sensors. It should be appreciated that the process 900 may be repeated independently by any number of image sensors.

At block 802, the process 800 includes configuring the image sensor based on a received middle frame image size. In this regard, in some embodiments, the image sensor is configured to capture a middle frame image data object based on the middle frame image size. In some embodiments, the image sensor is configured to execute one or more image data manipulation operations (e.g., cropping and/or padding) when capturing a middle frame image data object.

At block 804, the process 800 includes capturing a middle frame image data object based on the received middle frame image size and a full frame image size. The full frame image size may be associated with the image sensor, for example where the image sensor is configured to capture a full frame image data object of the full frame image size. In this regard, to capture the middle frame image data object, the image sensor may crop and/or pad data that is captured by the image sensor. For example, the middle frame image data object may be captured based on the difference between the full frame image size and the configured middle frame image size, such that sufficient data is cropped from the captured data and/or padded in addition to the captured data. In some such embodiments, the cropping and/or padding of the captured data is performed as described below with respect to FIG. 10.

At block 806, the process 800 includes transmitting the middle frame image data object to the image frame multiplexer. In some such embodiments, for example, an image sensor is configured with an output channel connected (e.g., wired) to an input channel of the image frame multiplexer. In this regard, the image sensor may transmit the middle frame image data object over such a connection such that the middle frame image multiplexer receives the middle frame image data object over the defined input channel associated with the sensor. A plurality of image sensors may each transmit their generated middle frame image data object to the image frame multiplexer utilizing various input channels, which may be selected from by the image frame multiplexer as described herein.

FIG. 9 illustrates an example flowchart including example additional operations for middle frame image processing, specifically a specific implementation for generating and outputting a middle frame image data object, in accordance with at least some example embodiments of the present disclosure. The example operations embody a process (or "method") 900. In some embodiments, it should be appreciated that the example operations embody a computer-implemented process to be performed by an apparatus, for example the middle frame imaging apparatus 100 described with respect to FIG. 1 above. For example, in some embodiments, the operations depicted with respect to FIG. 9 are performed by an image sensor, and/or corresponding support circuitry, of a middle frame imaging apparatus. It should be appreciated that each image sensor of a plurality of image sensors may be configured to perform the process 900 independent from the other image sensors. It should be appreciated that the process 900 may be repeated independently by any number of image sensors.

At block 902, the process 900 includes capturing a full frame image data object associated with a full frame image size. It should be appreciated that an image sensor may be configured to capture a full frame image data object using any of a myriad of known methodologies. Further in this regard, it should be appreciated that an image sensor may capture a full frame image data object using a different methodology based on the implementation of the image sensor (e.g., CCD, CMOS, or the like). In some embodiments having a plurality of image sensors, any number of image sensor types may be used (e.g., all same image sensor types, all different image sensor types, or some image sensors of a particular image sensor type and some of other image sensor types).

At block 904, the process 900 includes identifying a middle frame image size. In this regard, the image sensor may have been previously configured with the middle frame image size. For example, the image sensor may have been configured as described above with respect to FIG. 7. In this regard, an image sensor and/or corresponding support circuitry may identify the middle frame image size from a data storage communicable with such component(s).

At block 906, the process 900 includes identifying a cropped image data portion of the full frame image data object based on the full frame image size and the middle frame image size. The cropped image data portion represents a particular region of interest within the full frame image size that matches, or is smaller than, the middle frame image size. In some embodiments, the cropped image data portion of the full frame image data object is identified by cropping at least one data row from the full frame image data object and/or at least one data column from the full frame image data object. It should be appreciated that if the full frame image size for the full frame image data object is smaller than the middle frame image size in both number of columns and number of rows, the cropped image data portion may embody the entire full frame image data object. An example process for identifying a cropped image data portion of the full frame image data object based on the full frame image size and the middle frame image size is provided in operations described herein with respect to FIG. 9.

At block 908, the process 900 includes identifying an image data padding based on the full frame image size and the middle frame image size. The image data padding includes a number of rows and/or a number of columns to be padded with padding data. In this regard, the image padding data may be used to fit a difference between the full frame image size and the middle frame image size. An example process for identifying an image data padding based on the full frame image size and the middle frame image size is provided in operations described herein with respect to FIG. 9.

At block 910, the process 900 includes generating the middle frame image data object based on the cropped image data portion of the full frame image data object and the image data padding. In some such embodiments, the middle frame image data object is generated to include the cropped image data portion centered within the middle frame image data object, with the image data padding evenly distributed around the cropped image data portion. In this regard, any image data padding may be evenly split between the various sides of the middle frame image data object (e.g., half of the row image data padding on top of the middle frame image data object, half of the row image data padding below the middle frame image data object, half of the column image data padding on the left of the middle frame image data object, and half of the column image data padding on the right of the middle frame image data object). In some embodiments, for example where the cropped image data portion includes a number of rows and columns that match those of the middle frame image size, the middle frame image data object is embodied by the cropped image data portion.

At block 912, the process 900 includes transmitting the middle frame image data object to the image frame multiplexer. In some such embodiments, for example, an image sensor is configured with an output channel connected (e.g., wired) to an input channel of the image frame multiplexer. In this regard, the image sensor may transmit the middle frame image data object over such a connection such that the middle frame image multiplexer receives the middle frame image data object over the defined input channel associated with the sensor. A plurality of image sensors may each transmit their generated middle frame image data object to the image frame multiplexer utilizing various input channels, which may be selected from by the image frame multiplexer as described herein.

FIG. 10 illustrates an example flowchart including example additional operations for middle frame image processing, specifically for identifying a cropped image data portion and/or image data padding for a particular full frame image data object, in accordance with at least some example embodiments of the present disclosure. The example operations embody a process (or "method") 1000. In some embodiments, it should be appreciated that the example operations embody a computer-implemented process to be performed by an apparatus, for example the middle frame imaging apparatus 100 described with respect to FIG. 1 above. For example, in some embodiments, the operations depicted with respect to FIG. 10 are performed by an image sensor, and/or corresponding support circuitry, of a middle frame imaging apparatus. It should be appreciated that each image sensor of a plurality of image sensors may be configured to perform the process 1000 independent from the other image sensors. It should also be appreciated that the process 1000 may be repeated independently by any number of image sensors.

In at least some embodiments, the process 1000 occurs after, or in place of, one or more blocks of the process 1000. In this regard, the process 1000 may occur in place of blocks 906 and 908 described above with respect to FIG. 9. Upon completion of the process 1000, or a subset of the operations therein, flow may continue to one or more other operations of another process. For example, as illustrated, flow may return to block 910 of the process 1000, as described above with respect to FIG. 9.

At block 1002, the process 1000 includes identifying a cropped image data portion of the full frame image data object based on the difference between the middle frame row count and full frame row count, and/or the difference between the middle frame column count and the full frame column count. In this regard, the cropped image data portion may be identified from the full frame image data object by cropping out the difference of rows and/or columns between the full frame image size and the middle frame image size. It should be appreciated that in some examples, only a number of data rows is/are cropped from the full frame image data object, and in other contexts only a number of data columns is/are cropped from the full frame image data object, while in yet other contexts both a number of data rows and data columns are cropped from the full frame image data object.

When cropping the full frame image data object, the difference between the row counts and/or column counts may be cropped evenly from the sides of the full frame image data object. In this regard, the difference between the middle frame row count and full frame row count may be evenly cropped from the top of the full frame image data object and the bottom of the full frame image data object, such that half of the difference is cropped from each side. In a particular non-limiting example where the row difference is 200, 100 data rows may be cropped from the top of the full frame image data object and 100 data rows may be cropped from the bottom of the full frame image data object. Similarly, the difference between the middle frame column count and full frame column count may be evenly cropped from the left of the full frame image data object and the right of the full frame image data object, such that half of the difference is cropped from each side. In a particular non-limiting example where the column difference is 240, 120 data columns may be cropped from the left of the full frame image data object and 120 data columns may be cropped from the right of the full frame image data object. After cropping the data rows, the remaining data rows represent the cropped image data portion of the full frame image data object.

In other implementations, other cropping methodologies may be used based on a particular region of interest. In some embodiments, a certain percentage of data may be cropped from various sides based on the image processing task to be accomplished. For example, in a first non-limiting example, 100% of the data rows may be cropped from the top of the full frame image data object, where the image processing task is likely to require the bottom of the captured full frame image data object. Alternatively, in another non-limiting example, 75% of may be cropped from the left of the full frame image data object and 25% from the right side, where the image processing task is likely to include useful data in the middle to middle-right portion of the full frame image data object.

In a circumstance where the full frame row count is not greater than the middle frame row count and the full frame column count is not greater than the middle frame column count, it should be appreciated that the captured data need not be cropped. In this regard, the full frame image size is either equal to or smaller than the middle frame image size in both directions (e.g., in rows and columns). As such, the cropped image data portion comprises captured data with no cropping, and thus represents the entirety of the full frame image data object for inclusion in the generated middle frame image data object.

In some embodiments, the process 1000 includes one or more determination steps regarding whether captured data should be cropped. For example, in at least some embodiments, the process 1000 includes determining whether a full frame row count is greater than a middle frame row count, and/or a full frame column count is greater than a middle frame column count. In this regard, a full frame data object captured by an image sensor is associated with a full frame image size that represents a full frame row count, indicating the number of data rows in the full frame image data object, and a full frame column count, indicating the number of data columns in the full frame image data object. Similarly, the middle frame image size represents a middle frame row count, indicating the number of data rows to be included in a corresponding middle frame image data object, and a middle frame column count, indicating the number of data columns to be included in a corresponding middle frame image data object. As such, the full frame row count may be compared with the middle frame row count to determine whether the full frame row count is greater than the middle frame row count, or is equal to or less than the middle frame row count. Similarly, the full frame column count may be compared with the middle frame column count to determine whether the full frame column count is greater than the middle frame column count. In some embodiments, an image sensor and/or supporting hardware is provided for performing such comparisons. The process 1000 may continue to identify the cropped image data portion based on the comparison. For example, in a circumstance where the full frame row count is greater than the middle frame row count, the full frame column count is greater than the middle frame column count, or both, the process 1000 includes identifying a cropped image data portion of the full frame image data object based on the difference between the middle frame row count and full frame row count, and/or the difference between the middle frame column count and the full frame column count. In a circumstance where the full frame row count is not greater than the middle frame row count and the full frame column count is not greater than the middle frame column count, the process 1000 includes identifying a cropped image data portion that includes the entirety of the full frame image data object.

At block 1004, the process 1000 includes identifying an image data padding based on the difference between the middle frame row count and full frame row count, and/or the difference between the middle count column count and the full frame column count. In this regard, the difference between the middle frame row count and full frame row count may be identified (e.g., Rp=Rm−Rf, where Rp is the image data padding row count, Rm is the middle frame row count and Rf is the full frame row count) for use as a padding in a first direction (e.g., vertical padding on top and/or bottom of a middle frame image data object). Similarly in this regard, the difference between the middle frame column count and the full frame column count may be identified (e.g., Cp=Cm−Cf, where Cp is the image data padding column count, Cm is the middle frame column count and Cf is the full frame column count) for use as padding in the second direction (e.g., horizontal padding on the left and/or right of the middle frame image data object). In this regard, the image data padding may embody the combination of the image data padding row column count and image data padding row count (e.g., (Cp, Rp)).

It should be appreciated that the padding may be identified based on a particular distribution for each side of the middle frame image data object. For example, in some embodiments the image data padding includes various values representing padding for each side of a corresponding middle frame image data object. In this regard, the image data padding may be represented by (Cp_left, Rp_top, Cp_right, Rp_bottom), or any other structured or unstructured format that enables determination of data padding to be included on each side. In some embodiments, the data padding for opposite sides are evenly distributed (e.g., Cp_left=Cp_right=(Cp/2), and/or Rp_top=Rp_bottom=(Rp/2)). Alternatively, in some embodiments, the data padding is distributed using different allocation percentages (e.g., Rp_top=0.75*Rp and Rp_bot=0.25*Rp) based on the image processing task.

It should be appreciated that, in a circumstance where the full frame row count is not less than the middle frame row count and the full frame column count is not less than the middle frame column count, the process 1000 may include identifying an image data padding that comprises no padding. In this regard, the full frame image size is either equal to or greater than the middle frame image size in both directions (e.g., in rows and columns) such that padding is not necessary. In some such embodiments, the image data padding may be set to a null or otherwise unreadable value. In other embodiments, the image data padding may be set to include a value of 0 for all padding values (e.g., (0, 0, 0, 0) for any combination of (Cp_left, Cp_right, Rp_top, Rp_bottom) or simply (0,0) for (Cp, Rp)). As such, the image data padding will provide no padding, and the generated middle frame image data object may include only the cropped image data portion identified in an earlier block.

In some embodiments, the process 1000 includes one or more determination steps regarding whether captured data should be padded. For example, in at least some embodiments, the process 1000 includes determining whether a full frame row count is less than the middle frame row count, and/or a full frame column count is less than the middle frame column count. As described above, the full frame column count may be compared with the middle frame column count to determine whether the full frame column count is less than the middle frame column count. In some embodiments, the results of an earlier performed comparison are utilized to avoid repeating comparisons between the row counts and column counts. In other embodiments, the image sensor and/or supporting hardware is provided for performing such comparisons.

After block 1002 and 1004, the identified cropped image data portion and image data padding may be utilized to generate a middle frame image data object that corresponds to the captured full frame image data object, for example upon returning to block 910 as described above with respect to FIG. 9. In this regard, the middle frame image data object may be embodied by the cropped image data portion (e.g., where the image data padding comprises no padding data). Alternatively, in some embodiments, the middle frame image data object may be embodied by the cropped image data portion with relevant padding data based on the image data padding. In a particular example context, where the full frame image size matches the middle frame image size in both directions, it should be appreciated that the middle frame image data object may include identical data to that of the full frame image data object (which also matches the identified cropped image data portion of the full frame image data object) as no cropping nor padding is necessary.

CONCLUSION

Although example apparatuses and processes have been described above, implementations of the subject matter and the functional operations described herein can be implemented in other types of digital electronic circuitry, or in other types of computer software, firmware, or hardware, including the structures disclosed in this specification and their structural equivalents, or in combinations of one or more of them.

The operations of processes and logic flows described herein can be performed by one or more programmable processors executing one or more computer programs to perform actions by operating on input information/data and generating output, or corresponding processing circuitry. Processors suitable for the execution of a computer program include, by way of example, both general and special purpose microprocessors, and any one or more processors of any kind of digital computer. Generally, a processor may be specially configured to perform certain instructions, or receive instructions and information/data from an accessible memory device.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A middle frame image processing apparatus comprising:
   a first image sensor configured to output a first middle frame image data object based on a first full frame image size and a middle frame image size;
   a second image sensor configured to output a second middle frame image data object based on a second full frame image size and the middle frame image size; and
   a processor that is in data communication with the first image sensor and the second image sensor, the processor configured to:
      select an image sensor from the first image sensor and the second image sensor;
      receive a middle frame image data object from the selected image sensor, wherein the middle frame image data object is one of the first middle frame image data object and the second middle frame image data object; and
      process the middle frame image data object.

2. The apparatus of claim 1, wherein at least the first image sensor is configured based on the middle frame image size, and wherein to output the middle frame image data object, the first image sensor is configured to:
   generate the first middle frame image data object from a first full frame image data object by performing one or more of:
      cropping the first full frame image data object to include, in the first middle frame image data object, a cropped image data portion of the first full frame image data object, the cropped image data portion identified based on the first full frame image size and the middle frame image size; and
      padding the first middle frame image data object based on an image data padding, the image data padding identified based on the first full frame image size and the middle frame image size; and
   transmit the first middle frame image data object to the processor.

3. The apparatus of claim 1, wherein the first full frame image size differs from the second full frame image size by at least one or more data rows and/or one or more data columns.

4. The apparatus of claim 1, wherein the first full frame image size is equivalent to the second full frame image size by having a shared number of data rows and a shared number of data columns.

5. The apparatus of claim 1, wherein the processor is configured to process the middle frame image data object to determine if useful data is missing from the middle frame image data object, and wherein the processor is further configured to:
   transmit a full frame request signal to the selected image sensor;
   receive a full frame data object from the selected image sensor, the full frame image data object including more data than the middle frame image data; and
   process the full frame image data object.

6. The apparatus of claim 1, wherein the processor is further configured to:
   configure at least one of the first image sensor to output the first middle frame image data object based on the middle frame image size, and the second image sensor to output the second middle frame image data object based on the middle frame image size.

7. The apparatus of claim 6, wherein configuring at least one of the first image sensor and the second image sensor comprises:
   identifying the first full frame image size associated with the first image sensor and the second full frame image size associated with the second image sensor;
   determining a largest image size based on the first full frame image size and the second full frame image size;
   determining a smallest image size based on the first full frame image size and the second full frame image size;
   generating the middle frame image size based on the largest image size and the smallest image size; and
   configuring at least one of the first image sensor and the second image sensor based on the middle frame image size.

8. The apparatus of claim 1, wherein in case the first image sensor is selected, the processor is configured to disable the second image sensor, and wherein in case the second image sensor is selected, the processor is configured to disable the first image sensor.

9. The apparatus of claim 1, wherein output lines from each of the first image sensor and the second image sensor are connected, and wherein only one of the first image sensor and the second image sensor is activated at a given time.

10. The apparatus of claim 1, wherein a first output line from the first image sensor is connected to a first port of the processor and a second output line from the second image sensor is connected to a second port of the processor.

11. A computer-implemented method for middle frame image processing, the computer-implemented method comprising:
   outputting, by a first image sensor, a first middle frame image data object based on a first full frame image size and a middle frame image size;
   capturing, by a second image sensor, a second middle frame image data object based on a second full frame image size and the middle frame image size;
   selecting, by a processor, an image sensor from the first image sensor and the second image sensor;
   receiving, by processor, a middle frame image data object from the selected image sensor, wherein the middle frame image data object is one of the first middle frame image data object and the second middle frame image data object; and
   processing, by the processor, the middle frame image data object.

12. The computer-implemented method of claim 11, wherein outputting the first middle frame image data object from the first image sensor comprises:
   identifying, by the first image sensor, the middle frame image size;
   identifying, by the first image sensor, a cropped image data portion of a first full frame image data object based on the first full frame image size and the middle frame image size;
   identifying, by the first image sensor, a first image data padding based on the first full frame image size and the middle frame image size;
   generating, by the first image sensor, the first middle frame image data object based on the cropped image data portion of the first full frame image data object and the first image data padding; and
   transmitting, by the first image sensor, the first middle frame image data object to the processor.

13. The computer-implemented method of claim 11, wherein the first full frame image size differs from the second full frame image size by at least one or more data rows and/or one or more data columns.

14. The computer-implemented method of claim 11, wherein the first full frame image size is equivalent to the second full frame image size by having a shared number of data rows and a shared number of data columns.

15. The computer-implemented method of claim 11, wherein processing, by the processor, the middle frame image data object comprises processing, by the processor, the middle frame image data object to determine if useful data is missing from the middle frame image data object, the computer-implemented method further comprising:
  transmitting, by the processor, a full frame request signal to the selected image sensor;
  receiving, by the processor, a full frame data object from the selected image sensor, the full frame image data object including more data than the middle frame image data object; and
  processing, by the processor, the full frame image data object.

16. The computer-implemented method of claim 11, the computer-implemented method further comprising:
  configuring, by the processor, at least one of:
    the first image sensor to output the first middle frame image data object based on the middle frame image size, and
    the second image sensor to output the second middle frame image data object based on the middle frame image size.

17. The computer-implemented method of claim 16, wherein configuring at least one of the first image sensor to output the first middle frame image data object based on the middle frame image size and the second image sensor to output the second middle frame image data object based on the middle frame image size comprises:
  identifying, by the processor, at least the first full frame image size associated with the first image sensor and the second full frame image size associated with the second image sensor;
  determining, by the processor, a largest image size based on the first full frame size and the second full frame image size;
  determining, by the processor, a smallest image size based on the first full frame image size and the second full frame image size;
  generating, by the processor, the middle frame image size based on the largest image size and the smallest image size; and
  configuring, by the processor, at least one of the first image sensor to output the first middle frame image data object based on the middle frame image size and the second image sensor to output the second middle frame image data object based on the middle frame image size.

18. The computer-implemented method of claim 11, the method further comprising:
  in case the first image sensor is selected, disabling the second image sensor, and
  in case the second image sensor is selected, disabling the first image sensor.

19. The computer-implemented method of claim 11, wherein output lines from each of the first image sensor and the second image sensor are connected, and wherein only one of the first image sensor and the second image sensor is activated at a given time.

20. The computer-implemented method of claim 11, wherein a first output line from the first image sensor is connected to a first port of the processor and a second output line from the second image sensor is connected to a second port of the processor.

* * * * *